US012769137B2

(12) United States Patent
Amayeh et al.

(10) Patent No.: US 12,769,137 B2
(45) **Date of Patent: *Oct. 20, 2026**

(54) FACE MODEL CAPTURE BY A WEARABLE DEVICE

(71) Applicant: Magic Leap, Inc., Plantation, FL (US)

(72) Inventors: Gholamreza Amayeh, Santa Clara, CA (US); Adrian Kaehler, Los Angeles, CA (US); Douglas Lee, Redwood City, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/364,357

(22) Filed: Oct. 21, 2025

(65) Prior Publication Data

US 2026/0044008 A1 Feb. 12, 2026

Related U.S. Application Data

(63) Continuation of application No. 18/981,592, filed on Dec. 15, 2024, now Pat. No. 12,474,588, which is a (Continued)

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/0103* (2013.01);
(Continued)

(58) Field of Classification Search
CPC .............. G02B 27/017; G02B 27/0093; G02B 27/0103; G02B 27/0172;
(Continued)

(56) References Cited

U.S. PATENT DOCUMENTS 5,844,656 A 12/1998 Ronzani et al.
6,556,196 B1 4/2003 Blanz et al.
(Continued)

FOREIGN PATENT DOCUMENTS

EP 2887639 A1 6/2015
JP H09193803 A 7/1997
(Continued)

OTHER PUBLICATIONS

EP23155488.2 Examination Report dated Apr. 24, 2026.
(Continued)

*Primary Examiner* — Cory A Almeida
(74) *Attorney, Agent, or Firm* — Tobias Intellectual Property Law, PLLC

(57) ABSTRACT

Systems and methods for generating a face model for a user of a head-mounted device are disclosed. The head-mounted device can include one or more eye cameras configured to image the face of the user while the user is putting the device on or taking the device off. The images obtained by the eye cameras may be analyzed using a stereoscopic vision technique, a monocular vision technique, or a combination, to generate a face model for the user. The face model can be used to generate a virtual image of at least a portion of the user's face, for example to be presented as an avatar.

20 Claims, 14 Drawing Sheets

Related U.S. Application Data continuation of application No. 18/345,396, filed on Jun. 30, 2023, now Pat. No. 12,204,111, which is a continuation of application No. 17/872,443, filed on Jul. 25, 2022, now Pat. No. 11,740,474, which is a continuation of application No. 17/196,394, filed on Mar. 9, 2021, now Pat. No. 11,428,941, which is a continuation of application No. 15/717,223, filed on Sep. 27, 2017, now Pat. No. 10,976,549.

(60) Provisional application No. 62/400,907, filed on Sep. 28, 2016.

(51) Int. Cl.
*G06V 20/64* (2022.01)
*G06V 40/16* (2022.01)
*G06V 40/19* (2022.01)

(52) U.S. Cl.
CPC ............ *G06V 20/64* (2022.01); *G06V 40/169* (2022.01); *G02B 2027/0105* (2013.01); *G02B 2027/0138* (2013.01); *G02B 2027/0174* (2013.01); *G02B 2027/0178* (2013.01); *G02B 2027/0187* (2013.01); *G06V 40/19* (2022.01); *G06V 2201/12* (2022.01)

(58) Field of Classification Search
CPC .... G02B 2027/0105; G02B 2027/0138; G02B 2027/0174; G02B 2027/0178; G02B 2027/0187; G06F 3/013; G06K 9/00201; G06K 9/00275; G06K 9/00604; G06K 2209/40; G06V 20/64; G06V 40/169; G06V 40/19; G06V 2201/12
See application file for complete search history.

(56) References Cited

U.S. PATENT DOCUMENTS

| | | | | |
|---|---|---|---|---|
| 6,850,221 | B1 | 2/2005 | Tickle | |
| D514,570 | S | 2/2006 | Ohta | |
| 7,481,531 | B2 | 1/2009 | Howell et al. | |
| 8,223,024 | B1 | 7/2012 | Petrou | |
| 8,248,458 | B2 | 8/2012 | Schowengerdt et al. | |
| 9,191,658 | B2 | 11/2015 | Kato et al. | |
| 9,264,803 | B1 | 2/2016 | Johnson et al. | |
| D752,529 | S | 3/2016 | Loretan et al. | |
| 9,317,126 | B2 * | 4/2016 | Fujimaki | G02B 27/0172 |
| D759,657 | S | 6/2016 | Kujawski et al. | |
| 9,479,736 | B1 | 10/2016 | Karakotsios | |
| 9,971,937 | B1 | 5/2018 | Ovsiannikov et al. | |
| 9,996,150 | B2 | 6/2018 | Swaminathan et al. | |
| 10,976,549 | B2 | 4/2021 | Amayeh et al. | |
| 11,428,941 | B2 | 8/2022 | Amayeh et al. | |
| 11,740,474 | B2 | 8/2023 | Amayeh et al. | |
| 12,204,111 | B2 | 1/2025 | Amayeh et al. | |
| 2006/0028436 | A1 | 2/2006 | Armstrong | |
| 2007/0081123 | A1 | 4/2007 | Lewis | |
| 2007/0120986 | A1 | 5/2007 | Nunomaki | |
| 2011/0150340 | A1 * | 6/2011 | Gotoh | G06V 40/175 382/190 |
| 2012/0127062 | A1 | 5/2012 | Bar-Zeev et al. | |
| 2012/0127284 | A1 | 5/2012 | Bar-Zeev et al. | |
| 2012/0146894 | A1 | 6/2012 | Yang et al. | |
| 2012/0162549 | A1 | 6/2012 | Gao et al. | |
| 2013/0082922 | A1 | 4/2013 | Miller | |
| 2013/0083003 | A1 | 4/2013 | Perez et al. | |
| 2013/0117377 | A1 | 5/2013 | Miller | |
| 2013/0125027 | A1 | 5/2013 | Abovitz | |
| 2013/0154906 | A1 | 6/2013 | Braun et al. | |
| 2013/0169683 | A1 | 7/2013 | Perez et al. | |
| 2013/0208234 | A1 | 8/2013 | Lewis | |
| 2013/0235169 | A1 | 9/2013 | Kato et al. | |
| 2013/0242262 | A1 | 9/2013 | Lewis | |
| 2013/0278631 | A1 * | 10/2013 | Border | G06F 3/04842 345/633 |
| 2013/0300653 | A1 | 11/2013 | Lewis et al. | |
| 2013/0339433 | A1 | 12/2013 | Li et al. | |
| 2014/0003762 | A1 | 1/2014 | Macnamara | |
| 2014/0016056 | A1 | 1/2014 | Miyake et al. | |
| 2014/0071163 | A1 | 3/2014 | Kinnebrew et al. | |
| 2014/0071539 | A1 | 3/2014 | Gao | |
| 2014/0104143 | A1 * | 4/2014 | Benson | G02B 27/017 345/8 |
| 2014/0177023 | A1 | 6/2014 | Gao et al. | |
| 2014/0218468 | A1 | 8/2014 | Gao et al. | |
| 2014/0253589 | A1 | 9/2014 | Tout et al. | |
| 2014/0254939 | A1 | 9/2014 | Kimura et al. | |
| 2014/0267420 | A1 | 9/2014 | Schowengerdt et al. | |
| 2014/0306866 | A1 | 10/2014 | Miller et al. | |
| 2014/0361976 | A1 | 12/2014 | Osman et al. | |
| 2014/0375540 | A1 | 12/2014 | Ackerman et al. | |
| 2014/0375542 | A1 | 12/2014 | Robbins et al. | |
| 2014/0375680 | A1 | 12/2014 | Ackerman et al. | |
| 2015/0016777 | A1 | 1/2015 | Abovitz et al. | |
| 2015/0103306 | A1 | 4/2015 | Kaji et al. | |
| 2015/0178939 | A1 | 6/2015 | Bradski et al. | |
| 2015/0189266 | A1 | 7/2015 | Zhou | |
| 2015/0205126 | A1 | 7/2015 | Schowengerdt | |
| 2015/0205494 | A1 | 7/2015 | Scott et al. | |
| 2015/0222883 | A1 | 8/2015 | Welch | |
| 2015/0222884 | A1 | 8/2015 | Cheng | |
| 2015/0268415 | A1 | 9/2015 | Schowengerdt et al. | |
| 2015/0302652 | A1 | 10/2015 | Miller et al. | |
| 2015/0309263 | A2 | 10/2015 | Abovitz et al. | |
| 2015/0310263 | A1 | 10/2015 | Zhang et al. | |
| 2015/0326570 | A1 | 11/2015 | Publicover et al. | |
| 2015/0346490 | A1 | 12/2015 | TeKolste et al. | |
| 2015/0346495 | A1 | 12/2015 | Welch et al. | |
| 2015/0362992 | A1 | 12/2015 | Jacobs et al. | |
| 2016/0007934 | A1 | 1/2016 | Arnold et al. | |
| 2016/0011419 | A1 | 1/2016 | Gao | |
| 2016/0025971 | A1 * | 1/2016 | Crow | A61B 3/113 345/156 |
| 2016/0026253 | A1 | 1/2016 | Bradski et al. | |
| 2016/0041048 | A1 | 2/2016 | Blum et al. | |
| 2016/0078278 | A1 | 3/2016 | Moore et al. | |
| 2016/0189426 | A1 | 6/2016 | Thomas et al. | |
| 2016/0217621 | A1 | 7/2016 | Raghoebardajal et al. | |
| 2017/0092235 | A1 | 3/2017 | Osman et al. | |
| 2017/0123526 | A1 | 5/2017 | Trail et al. | |
| 2017/0123744 | A1 | 5/2017 | Park et al. | |
| 2017/0124713 | A1 | 5/2017 | Jurgenson et al. | |
| 2017/0206691 | A1 | 7/2017 | Harrises et al. | |
| 2017/0277254 | A1 * | 9/2017 | Osman | A63F 13/32 |
| 2018/0088340 | A1 | 3/2018 | Amayeh et al. | |
| 2018/0253897 | A1 | 9/2018 | Satake | |
| 2021/0223552 | A1 | 7/2021 | Amayeh et al. | |
| 2022/0357582 | A1 | 11/2022 | Amayeh et al. | |
| 2023/0359044 | A1 | 11/2023 | Amayeh et al. | |
| 2025/0116868 | A1 | 4/2025 | Amayeh et al. | |

FOREIGN PATENT DOCUMENTS

| | | | | |
|---|---|---|---|---|
| JP | 2014064248 A | | 4/2014 | |
| WO | WO-2015192117 A1 | * | 12/2015 | A63F 13/00 |
| WO | 2016129156 A1 | | 8/2016 | |
| WO | 2018064169 A1 | | 4/2018 | |

OTHER PUBLICATIONS

EP23155488.2 Extended European Search Report dated May 30, 2023.

Zhao, Yajie, et al., Mask-off: Synthesizing Face Images in the Presence of Head-mounted Displays, Oct. 26, 2016, pp. 1-12, XP055432322, Retrieved from https://arxiv.org/abs/1610.08481, Abstract, Figures 1, 2, 4, 5.

"Introduction to SURF (Speeded-Up Robust Features)", OpenCV, accessed Apr. 29, 2016, in 5 pages. URL: http://docs.opencv.org/3.0-beta/doc/py_tutorials/py_feature2d/py_surf_intro/py_surf_intro.html.

(56) References Cited

OTHER PUBLICATIONS

"Scale-invariant feature transform", Wikipedia, printed Feb. 29, 2016, in 18 pages. URL: http://en.wikipedia.org/wiki/Scale-invariant_feature_transform.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/raskar/book/BimberRaskarAugmentedRealityBook.pdf.
EP23168280.8 Extended European Search Report dated Jul. 6, 2023.
EP24205698.4 Extended European Search Report dated Dec. 17, 2024.
International Preliminary Report on Patentability for PCT Application No. PCT/US2017/053729, dated Apr. 2, 2019.
International Search Report and Written Opinion for PCT Application No. PCT/US2017/053729, dated Nov. 30, 2017.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
JP2022-34301 Office Action dated May 9, 2023.
KR2022-7017129 Final Office Action dated Sep. 21, 2023.
Liu Z. et al., "Face Geometry and Appearance Modeling: Concepts and Applications," Cambridge University Press, Apr. 2011, in 172 pages (uploaded in two parts).
Mattoccia, S., "Stereo Vision: Algorithms and Applications," University of Bologna, Jan. 2013, in 208 pages.
Rublee, E. et al., "ORB: an efficient alternative to SIFT or SURF", Menlo Park, California, Nov. 2011, in 8 pages.
Strub, et al.: "Automated Facial Conformation for Model-Based Videophone Coding," Proceedings of the International Conference on Image Processing (ICIP). IEEE Comp. Soc. Press, US, vol. 2, Oct. 23, 1995, pp. 587-590.
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
U.S. Appl. No. 18/401,020 Office Action dated Dec. 6, 2024.
Wikipedia: "Iterative closest point", Wikipedia, printed Feb. 29, 2016, in 3 pages. URL: https://en.wikipedia.org/wiki/Iterative_closest_point.
Wikipedia: "Lucky Imaging," Wikipedia, printed Jul. 6, 2016, in 6 pages. URL: https://en.wikipedia.org/wiki/Lucky_imaging.
Wikipedia: "Super-resolution imaging", Wikipedia, printed Jul. 6, 2016, in 6 pages. URL: https://en.wikipedia.org/wiki/Super-resolution_imaging.
Zhang, et al., "Occlusion-free Face Alignment: Deep Regression Networks Coupled with De-corrupt AutoEncoders," 2016 IEEE Conference on Computer Vision and Pattern Recognition, The Computer Society, Jun. 2016.

* cited by examiner

FACE MODEL CAPTURE BY A WEARABLE DEVICE

PRIORITY CLAIM

This application is a continuation of U.S. patent application Ser. No. 18/981,592, filed Dec. 15, 2024, titled "FACE MODEL CAPTURE BY A WEARABLE DEVICE," which is a continuation of U.S. patent application Ser. No. 18/345,396, filed Jun. 30, 2023, titled "FACE MODEL CAPTURE BY A WEARABLE DEVICE," which is a continuation of U.S. patent application Ser. No. 17/872,443, filed Jul. 25, 2022, titled "FACE MODEL CAPTURE BY A WEARABLE DEVICE," which is a continuation of U.S. patent application Ser. No. 17/196,394, filed Mar. 9, 2021, titled "FACE MODEL CAPTURE BY A WEARABLE DEVICE," which is a continuation of U.S. patent application Ser. No. 15/717,223, filed Sep. 27, 2017, titled "FACE MODEL CAPTURE BY A WEARABLE DEVICE," which claims the benefit of priority under 35 U.S.C. § 119 (e) to U.S. Provisional Patent Application No. 62/400,907, filed on Sep. 28, 2016, titled "FACE MODEL CAPTURE BY AN AUGMENTED REALITY DEVICE." The entire contents of each of the above-referenced applications are hereby incorporated by reference into this application.

FIELD

The present disclosure relates to virtual reality and augmented reality imaging and visualization systems and more particularly to generating a face model of a user of such systems.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of a mixed reality system for capturing face images and determining a face model are disclosed.

Systems and methods for generating a face model for a user of a head-mounted device are disclosed. The head-mounted device can include one or more eye cameras configured to image the face of the user while the user is putting the device on or taking the device off. The images obtained by the eye cameras may be analyzed using a stereoscopic vision technique, a monocular vision technique, or a combination, to generate a face model for the user.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
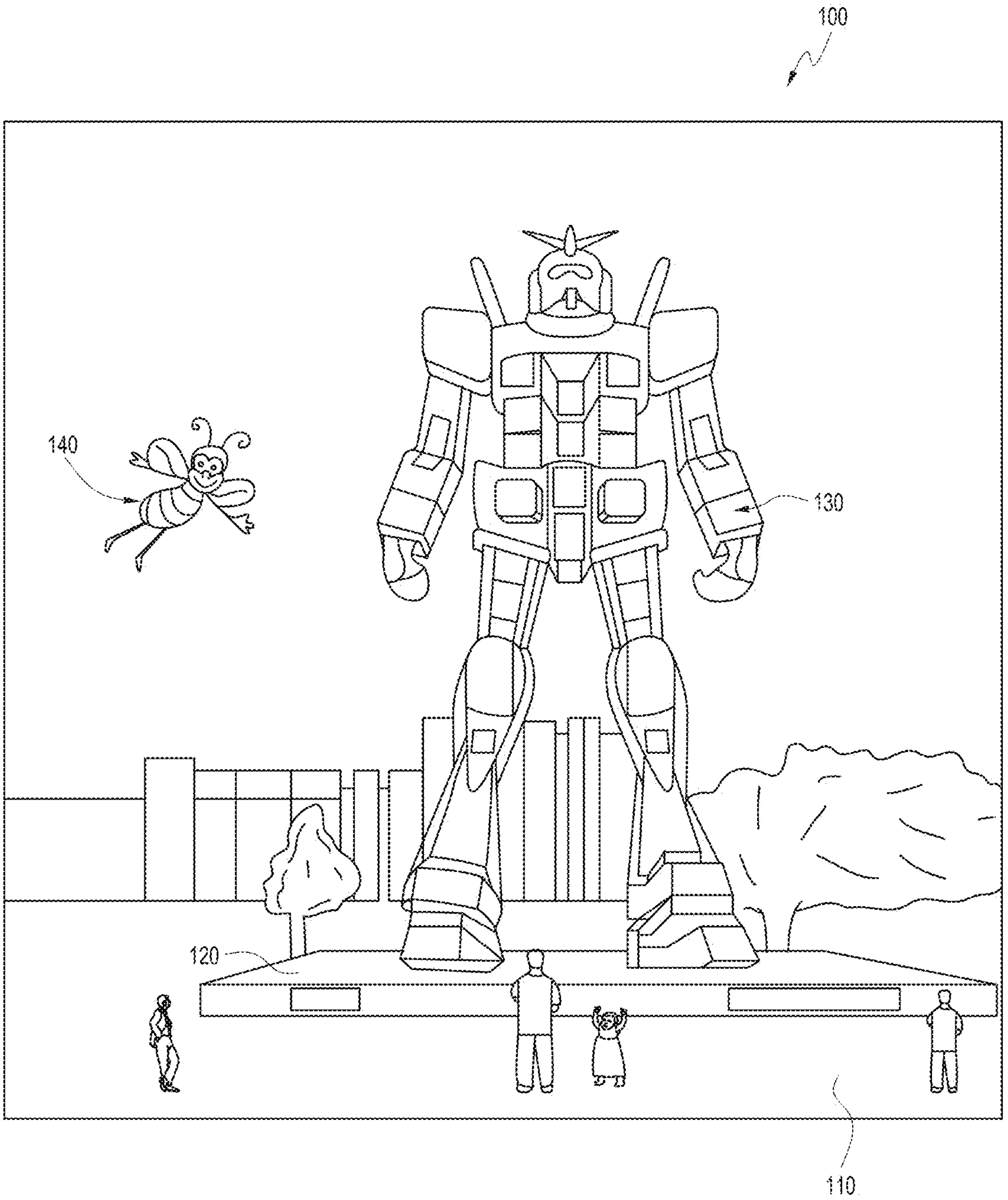
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A user of an augmented or a virtual reality system can use a wearable device, such as a head mounted display (HMD) to immerse in an alternative world with virtual objects. Sometimes, the wearable device may present an avatar (which includes, e.g., a virtual image) of the user in that alternative world for interactions with other users. To provide realistic images and movements for the avatar, the wearable device can provide the avatar images based on the user's facial look and expressions. The avatar image may be built based on the images acquired by one or more imaging systems of the wearable device. The imaging systems can include an inward-facing imaging system which can comprise eye cameras to track user's eye movements and an outward-facing imaging system which can comprise cameras for imaging the user's environment. However, the imaging systems of the wearable device cannot easily image the face of the user once it is placed on the user's head. For example, the inward-facing imaging system can be configured to image the periocular region of the user when the wearable device worn by the user and the eye cameras may not have a large enough field of view for imaging the user's whole face. As another example, the cameras of the outward-facing imaging system are configured to point away from the user when the user wears the wearable device and thus cannot easily obtain a face image of the user. This results in a variety of difficulties for generating an acceptable image for rendering the virtual avatar.

The wearable device described herein is directed to reducing these difficulties by providing an imaging system configured to obtain images of the user's face while the user is putting on or taking off the wearable device. Advantageously, the wearable device can use the inward-facing imaging system to obtain images of the user's face while the user is putting on or taking off the device, which provides an unconventional application of the inward-facing imaging system (whose purpose is eye tracking) to acquire face images. Further, the wearable device can automatically start and stop imaging the user's face by detecting a starting or a stopping trigger (e.g., which may be based on the images acquired by the wearable device or based on the movement of the wearable device). Advantageously, by automatically acquiring images while the user is putting on or taking off the device, the user may not need to perform additional actions (e.g., rotating or moving the wearable device around the user's head) in order for the wearable device to generate a face model. Also, by stopping imaging when the wearable device is seated on the user's face, the inward-facing imaging system can automatically begin its (typically) primary function of tracking the user's eyes.

The images can include still images, photographs, animations, individual frames from a video, or a video. The wearable device may build a three-dimensional (3D) model of the user's face based on the images acquired by the imaging system. For example, the wearable device can have two eye cameras each configured to video a region of the user's face. For each frame of the video, the wearable device can synthesize images acquired by the two eye cameras to generate the 3D face model. Additionally or alternatively, the wearable device can separately synthesize images acquired by each eye camera and combine the synthesized the images for each eye camera to generate the 3D face model.

The resulting model may be used for purposes such as generating a virtual avatar, determining fit of the wearable device, performing user identification, performing image registration, or tuning operational parameters of the wearable device such as, for example, adjusting the rendering locations of the virtual images, the relative position or orientation of the light projectors, etc., based on the interocular separation of the user's eyes (e.g., an interpupillary distance) or other metric of the user's face

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2:
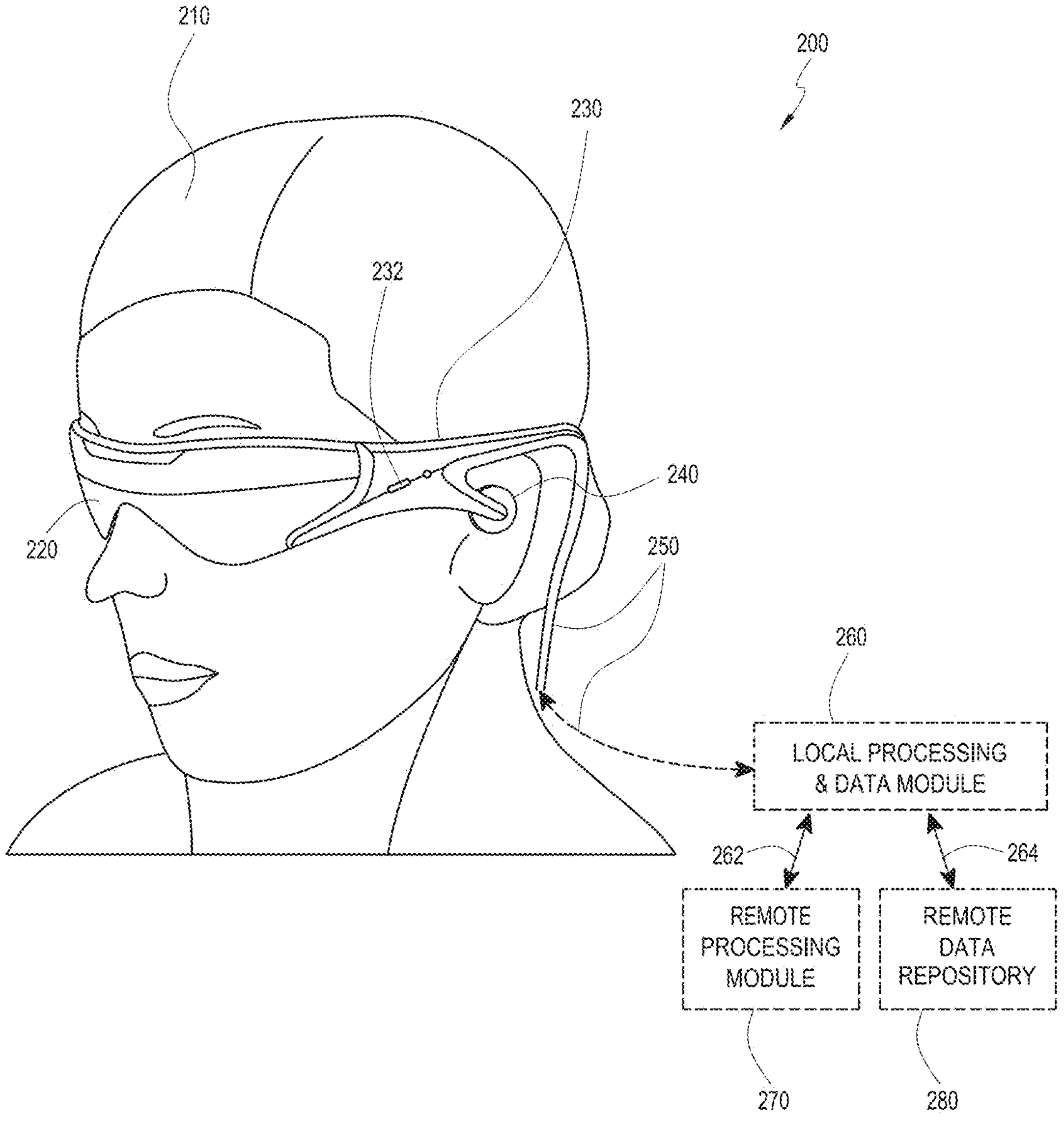
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye. As another example, the pupil diameter or orientation of only one eye is determined (e.g., based on images acquired for a camera configured to acquire the images of that eye) and the eye features determined for this eye are assumed to be similar for the other eye of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Figure 3:
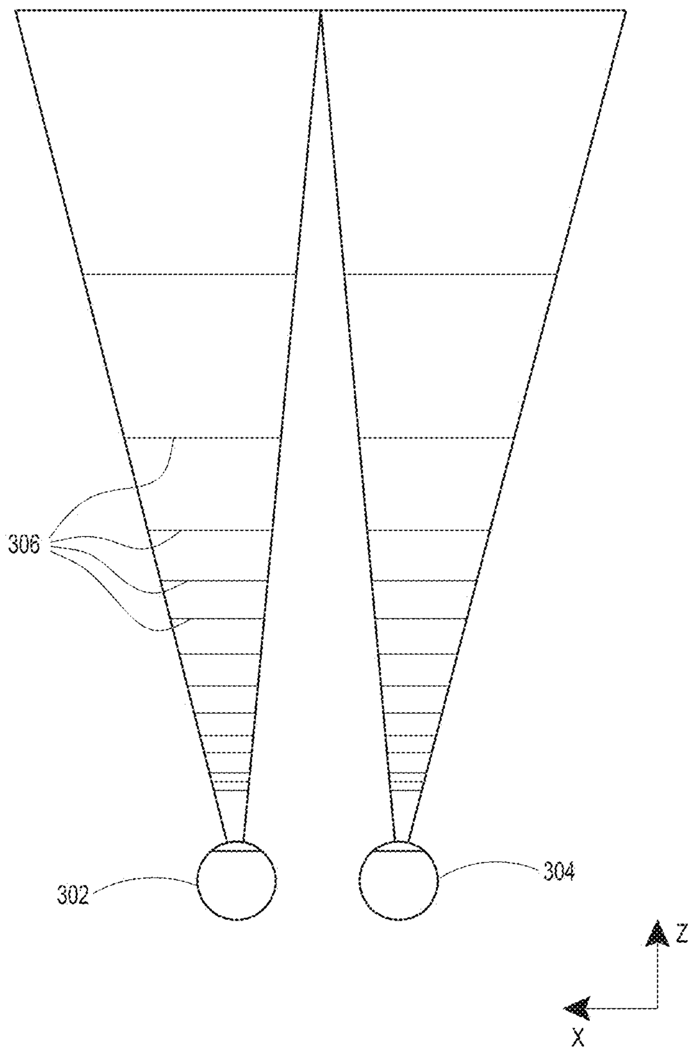
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
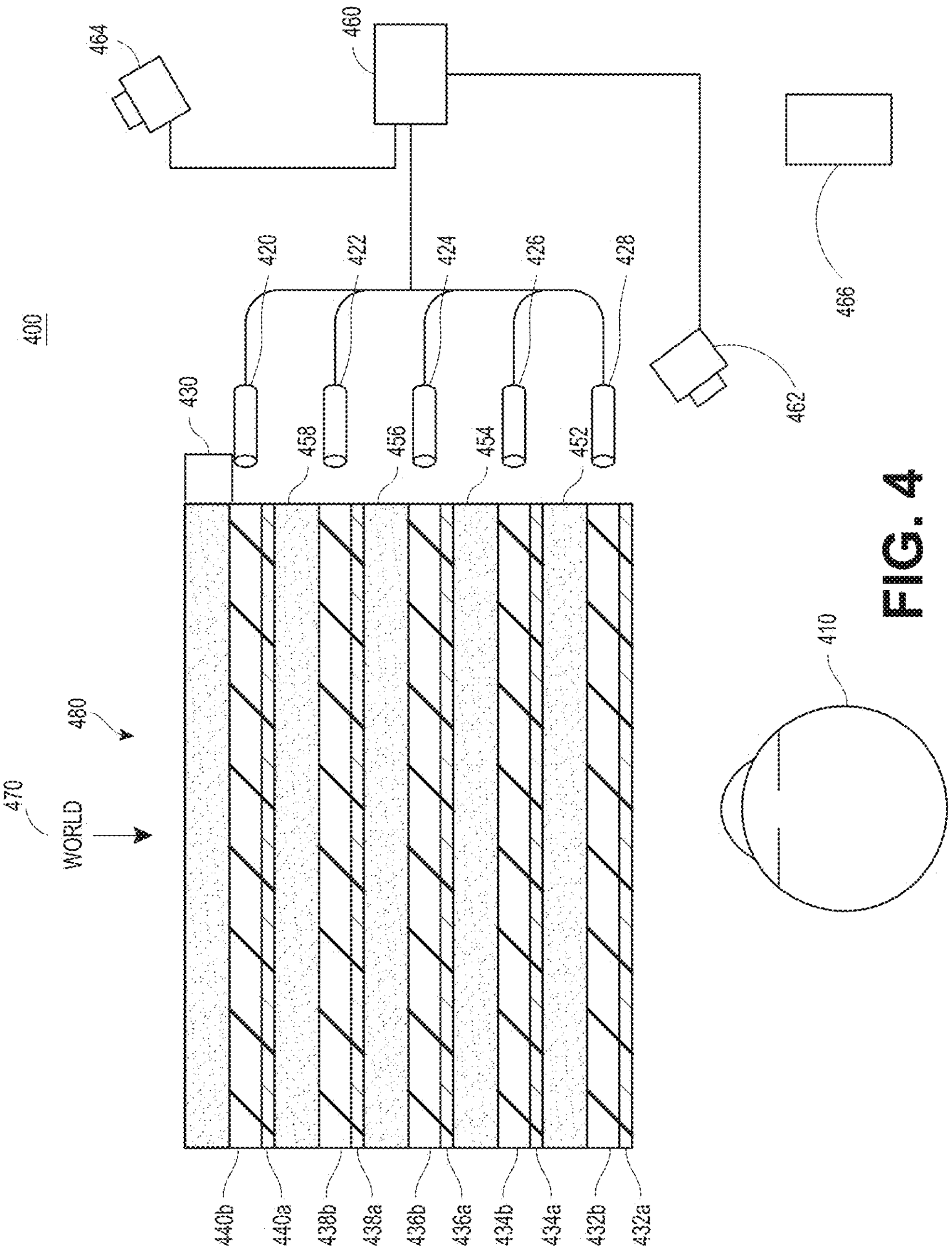
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides **432*b*, 434*b*, 436*b*, 438*b*, 4400*b*. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2**.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432*b*, 434*b*, 436*b*, 438*b*, 440*b* or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440*b*, 438*b*, 436*b*, 434*b*, 432*b*, each of which may be configured to distribute incoming light across each respective waveguide, for output toward the eye 410 (which may correspond to the eye 304 in FIG. 3). Light exits an output surface of the image injection devices 420, 422, 424, 426, 428 and is injected into a corresponding input edge of the waveguides 440*b*, 438*b*, 436*b*, 434*b*, 432*b*. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440*b*, 438*b*, 436*b*, 434*b*, 432*b*, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440*b*, 438*b*, 436*b*, 434*b*, 432*b*. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440*b*, 438*b*, 436*b*, 434*b*, 432*b* may be configured to propagate light within each respective waveguide by total internal reflection (TIR). The waveguides 440*b*, 438*b*, 436*b*, 434*b*, 432*b* may each be planar or have another shape (e.g., curved), with major top and bottom surfaces and edges extending between those major top and bottom surfaces. In the illustrated configuration, the waveguides 440*b*, 438*b*, 436*b*, 434*b*, 432*b* may each include light extracting optical elements 440*a*, 438*a*, 436*a*, 434*a*, 432*a* that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440*a*, 438*a*, 436*a*, 434*a*, 432*a*) may, for example, be reflective or diffractive optical features. While illustrated disposed at the bottom major surfaces of the waveguides 440*b*, 438*b*, 436*b*, 434*b*, 432*b* for ease of description and drawing clarity, in some embodiments, the light extracting optical elements 440*a*, 438*a*, 436*a*, 434*a*, 432*a* may be disposed at the top or bottom major surfaces, or may be disposed directly in the volume of the waveguides 440*b*, 438*b*, 436*b*, 434*b*, 432*b*. In some embodiments, the light extracting optical elements 440*a*, 438*a*, 436*a*, 434*a*, 432*a* may be formed in a layer of material that is attached to a transparent substrate to form the waveguides 440*b*, 438*b*, 436*b*, 434*b*, 432*b*. In some other embodiments, the waveguides 440*b*, 438*b*, 436*b*, 434*b*, 432*b* may be a monolithic piece of material and the light extracting optical elements 440*a*, 438*a*, 436*a*, 434*a*, 432*a* may be formed on a surface or in the interior of that piece of material.

With continued reference to FIG. 4, as discussed herein, each waveguide 440*b*, 438*b*, 436*b*, 434*b*, 432*b* is configured to output light to form an image corresponding to a particular depth plane. For example, the waveguide 432*b* nearest the eye may be configured to deliver collimated light, as injected into such waveguide 432*b*, to the eye 410. The collimated light may be representative of the optical infinity focal plane. The next waveguide up 434*b* may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434*b* as coming from a first focal plane closer inward toward the eye 410 from optical infinity. Similarly, the third up waveguide 436*b* passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436*b* as coming from a second focal plane that is even closer inward toward the person from optical infinity than was light from the next waveguide up 434*b*.

The other waveguide layers (e.g., waveguides 438*b*, 440*b*) and lenses (e.g., lenses 456, 458) are similarly configured, with the highest waveguide 440*b* in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440*a*, 438*a*, 436*a*, 434*a*, 432*a* may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440_a_, 438_a_, 436_a_, 434_a_, 432_a_ may be volumetric or surface features, which may be configured to output light at specific angles. For example, the light extracting optical elements 440_a_, 438_a_, 436_a_, 434_a_, 432_a_ may be volume holograms, surface holograms, and/or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440_a_, 438_a_, 436_a_, 434_a_, 432_a_ are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
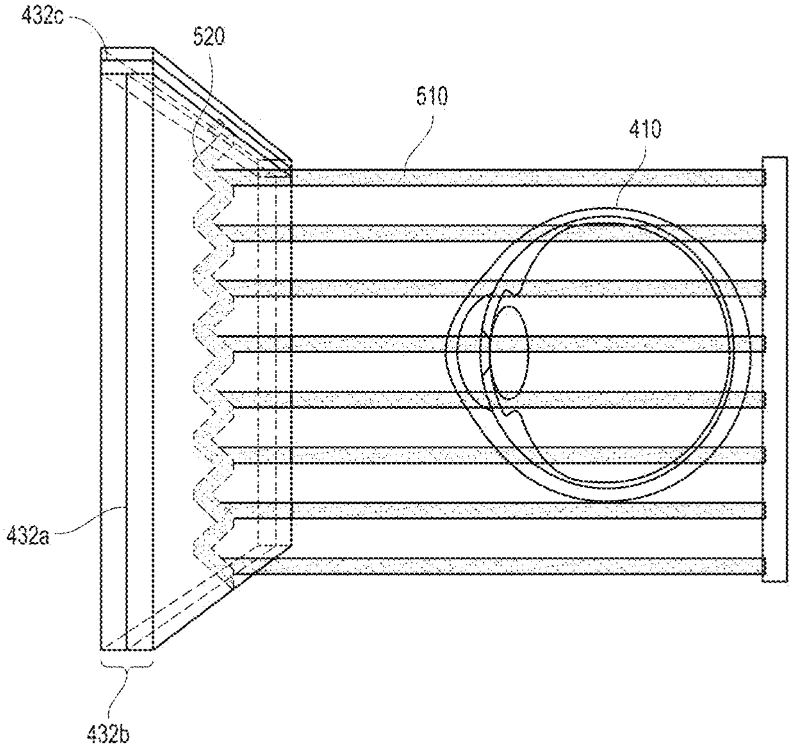
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide **432*b* at the input edge 432*c* of the waveguide 432*b* and propagates within the waveguide 432*b* by TIR. At points where the light 520 impinges on the DOE 432*a*, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432*b*. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410** than optical infinity.

Figure 6:
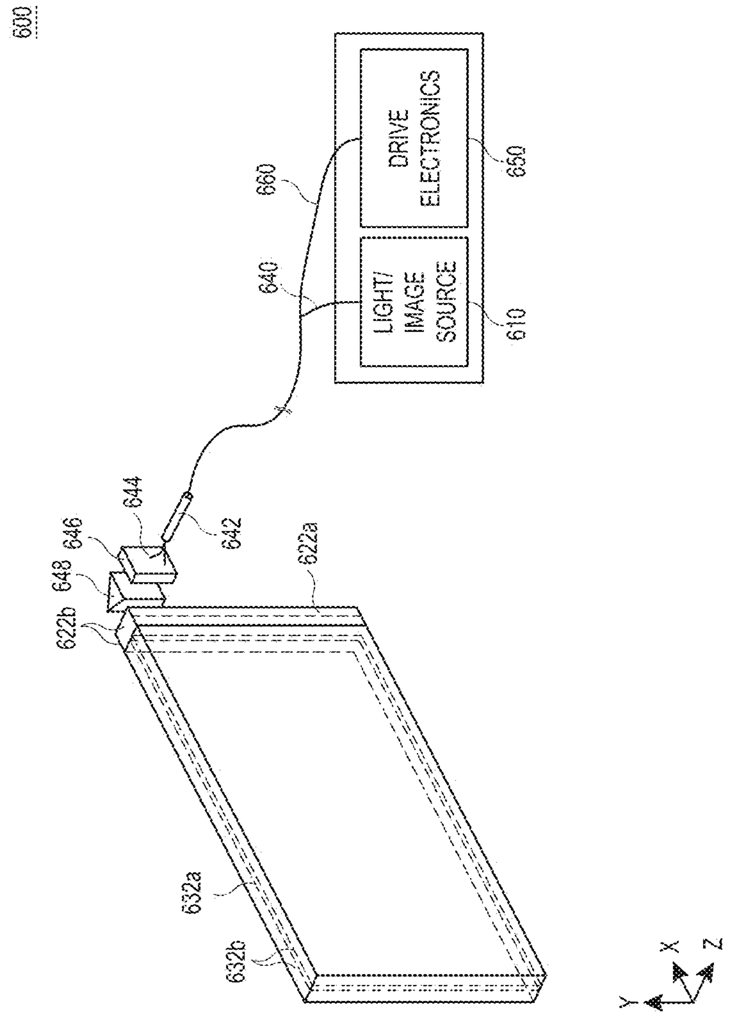
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides **632*a* (only one is shown in FIG. 6) and one or more DOEs 632*b* associated with each of at least some of the primary waveguides 632*a*. The planar waveguides 632*b* can be similar to the waveguides 432*b*, 434*b*, 436*b*, 438*b*, 440*b* discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622*b* and at least one DOE 622*a* (illustrated by double dash-dot line) associated with the distribution planar waveguide 622*b*. The distribution planar waveguide 622*b* may be similar or identical in at least some respects to the primary planar waveguide 632*b*, having a different orientation therefrom. Likewise, at least one DOE 622*a* may be similar to or identical in at least some respects to the DOE 632*a*. For example, the distribution planar waveguide 622*b* or DOE 622*a* may be comprised of the same materials as the primary planar waveguide 632*b* or DOE 632*a*, respectively. Embodiments of the optical display system 600 shown in FIG. 6 can be integrated into the wearable system 200 shown in FIG. 2**.

The relayed and exit-pupil expanded light may be optically coupled from the distribution waveguide apparatus into the one or more primary planar waveguides **632*b*. The primary planar waveguide 632*b* can relay light along a second axis, preferably orthogonal to first axis (e.g., horizontal or X-axis in view of FIG. 6). Notably, the second axis can be a non-orthogonal axis to the first axis. The primary planar waveguide 632*b* expands the light's effective exit pupil along that second axis (e.g., X-axis). For example, the distribution planar waveguide 622*b* can relay and expand light along the vertical or Y-axis, and pass that light to the primary planar waveguide 632*b*** which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622*b* which contains the at least one diffractive optical element (DOE) 622*a*. The collimated light can propagate vertically (relative to the view of FIG. 6) along the distribution planar waveguide 622*b* by TIR, and in doing so repeatedly intersects with the DOE 622*a*. The DOE 622*a* preferably has a low diffraction efficiency. This can cause a fraction (e.g., 10%) of the light to be diffracted toward an edge of the larger primary planar waveguide 632*b* at each point of intersection with the DOE 622*a*, and a fraction of the light to continue on its original trajectory down the length of the distribution planar waveguide 622*b* via TIR.

At each point of intersection with the DOE 622*a*, additional light can be diffracted toward the entrance of the primary waveguide 632*b*. By dividing the incoming light into multiple outcoupled sets, the exit pupil of the light can be expanded vertically by the DOE 622*a* in the distribution planar waveguide 622*b*. This vertically expanded light coupled out of distribution planar waveguide 622*b* can enter the edge of the primary planar waveguide 632*b*.

Light entering primary waveguide 632*b* can propagate horizontally (relative to the view of FIG. 6) along the primary waveguide 632*b* via TIR. As the light intersects with DOE 632*a* at multiple points as it propagates horizontally along at least a portion of the length of the primary waveguide 632*b* via TIR. The DOE 632*a* may advantageously be designed or configured to have a phase profile that is a summation of a linear diffraction pattern and a radially symmetric diffractive pattern, to produce both deflection and focusing of the light. The DOE 632*a* may advantageously have a low diffraction efficiency (e.g., 10%), so that only a portion of the light of the beam is deflected toward the eye of the view with each intersection of the DOE 632*a* while the rest of the light continues to propagate through the primary waveguide 632*b* via TIR.

At each point of intersection between the propagating light and the DOE 632*a*, a fraction of the light is diffracted toward the adjacent face of the primary waveguide 632*b* allowing the light to escape the TIR, and emerge from the face of the primary waveguide 632*b*. In some embodiments, the radially symmetric diffraction pattern of the DOE 632*a* additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632*b* by a multiplicity of DOEs 632*a* at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
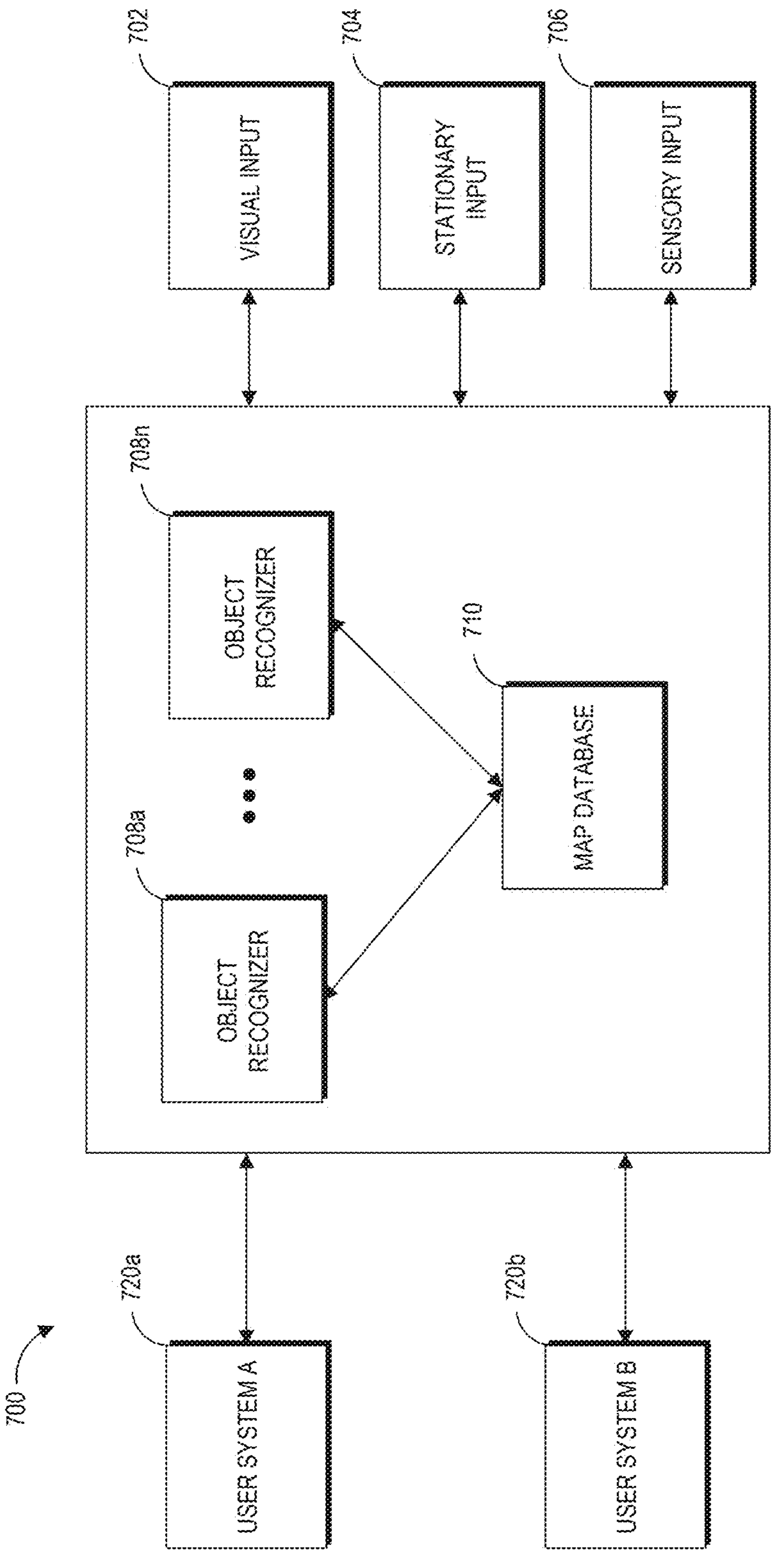
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708*a* to 708*n* may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708*a* may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708*a* to 708*n* may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
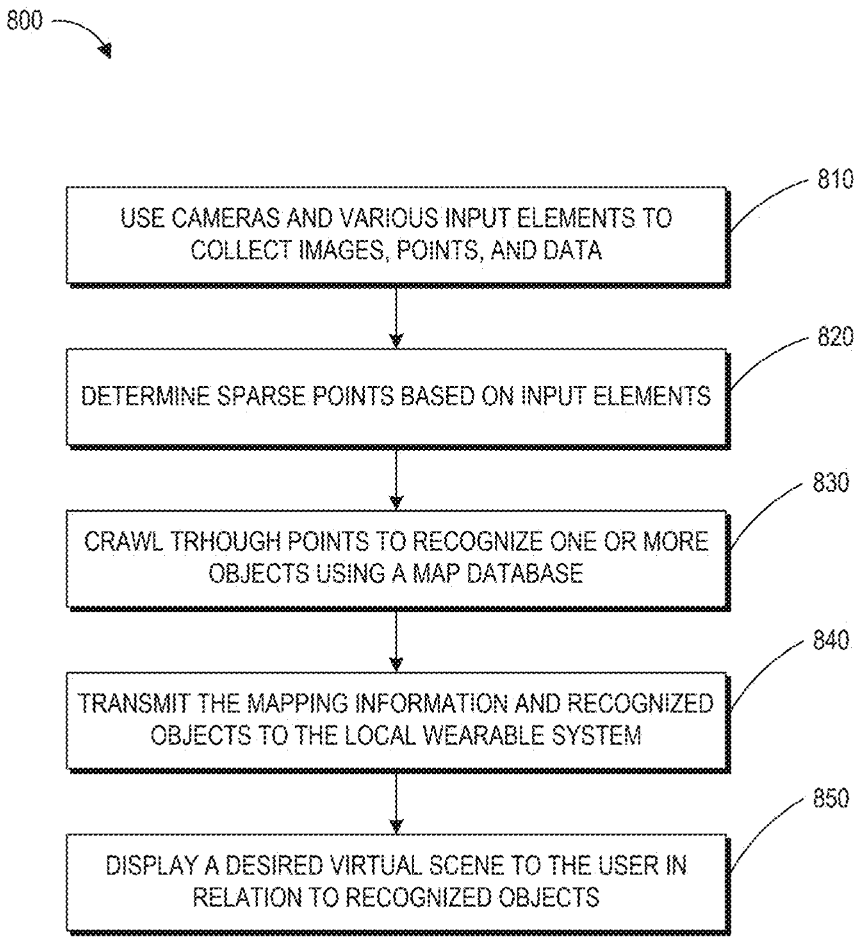
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708*a*-708*n* may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
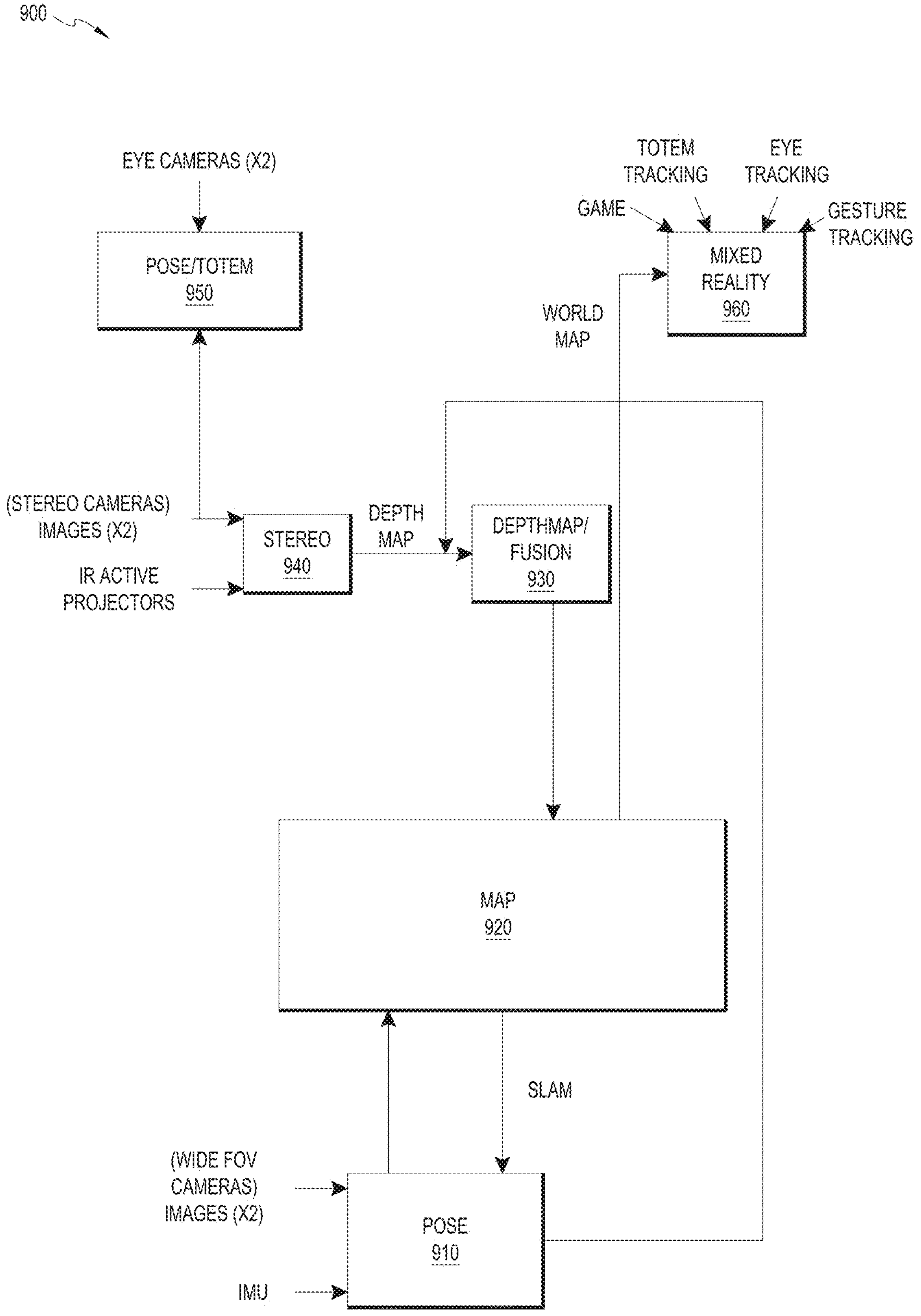
FIG. 9 is a block diagram of another example of a wearable system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g., a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras and the pair of cameras for the stereo process 940 may be a part of the outward-facing imaging system 464 (shown in FIG. 4). The wearable system 900 can include eye tracking cameras (which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
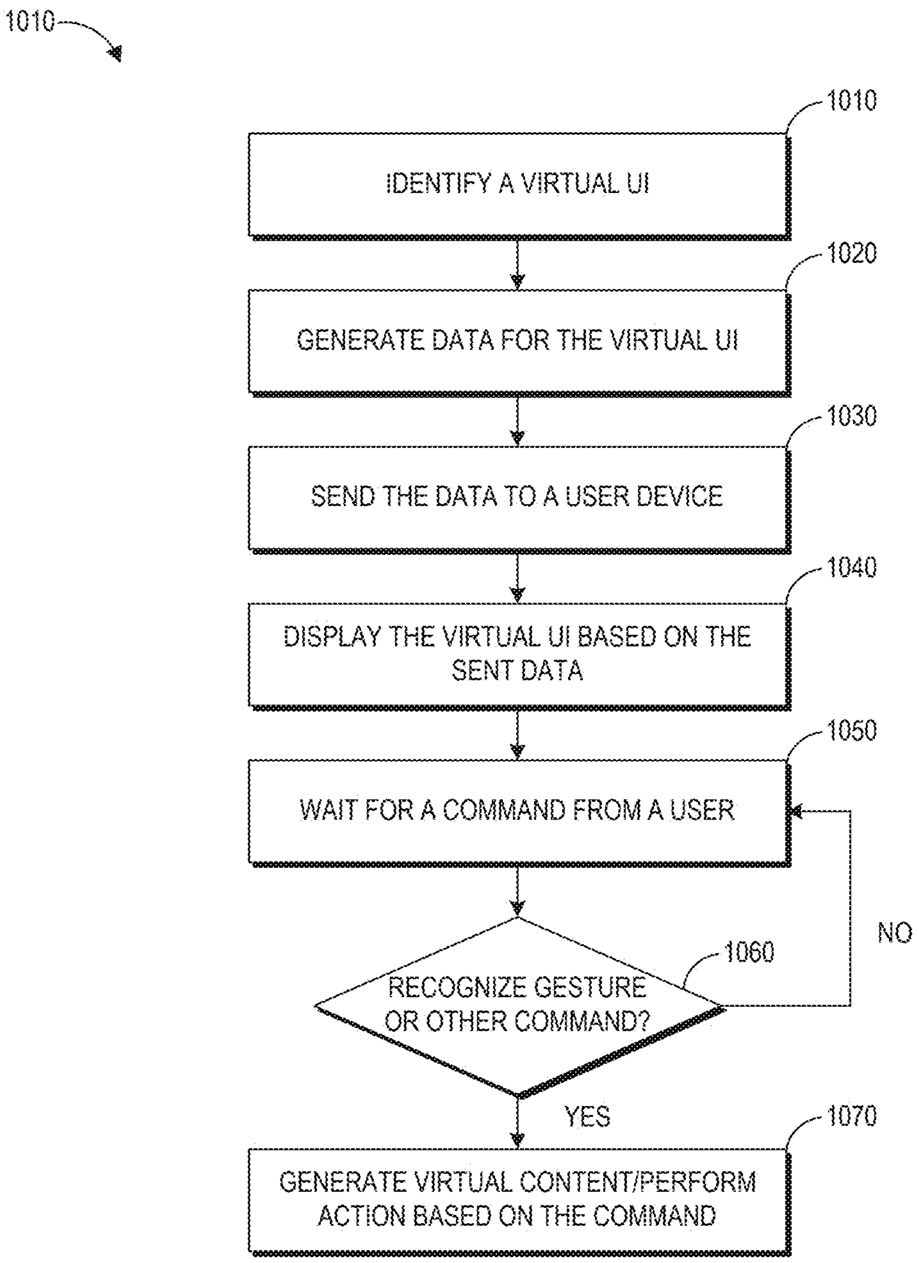
FIG. 10 is a process flow diagram of an example of a method for interacting with a virtual user interface.

FIG. 10 is a process flow diagram of an example of a method 1000 for interacting with a virtual user interface. The method 1000 may be performed by the wearable system described herein. The method 1000 may perform the method 1000 in a telepresence session.

At block 1010, the wearable system may identify a particular UI. The type of UI may be predetermined by the user. The wearable system may identify that a particular UI needs to be populated based on a user input (e.g., gesture, visual data, audio data, sensory data, direct command, etc.). The UI may be specific to a telepresence session. At block 1020, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the telepresence context, the UI may be displayed as if the UI were surrounding user to create a tangible sense of another user's presence in the environment (e.g., the UI can display virtual avatars of the participants around the user). If the UI is hand centric, the map coordinates of the user's hands may be determined. These map points may be derived through data received through the FOV cameras, sensory input, or any other type of collected data.

At block 1030, the wearable system may send the data to the display from the cloud or the data may be sent from a local database to the display components. At block 1040, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1050. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1060), virtual content associated with the command may be displayed to the user (block 1070).

Example of Wearable Devices for Generating a Face Model

Figure 11:
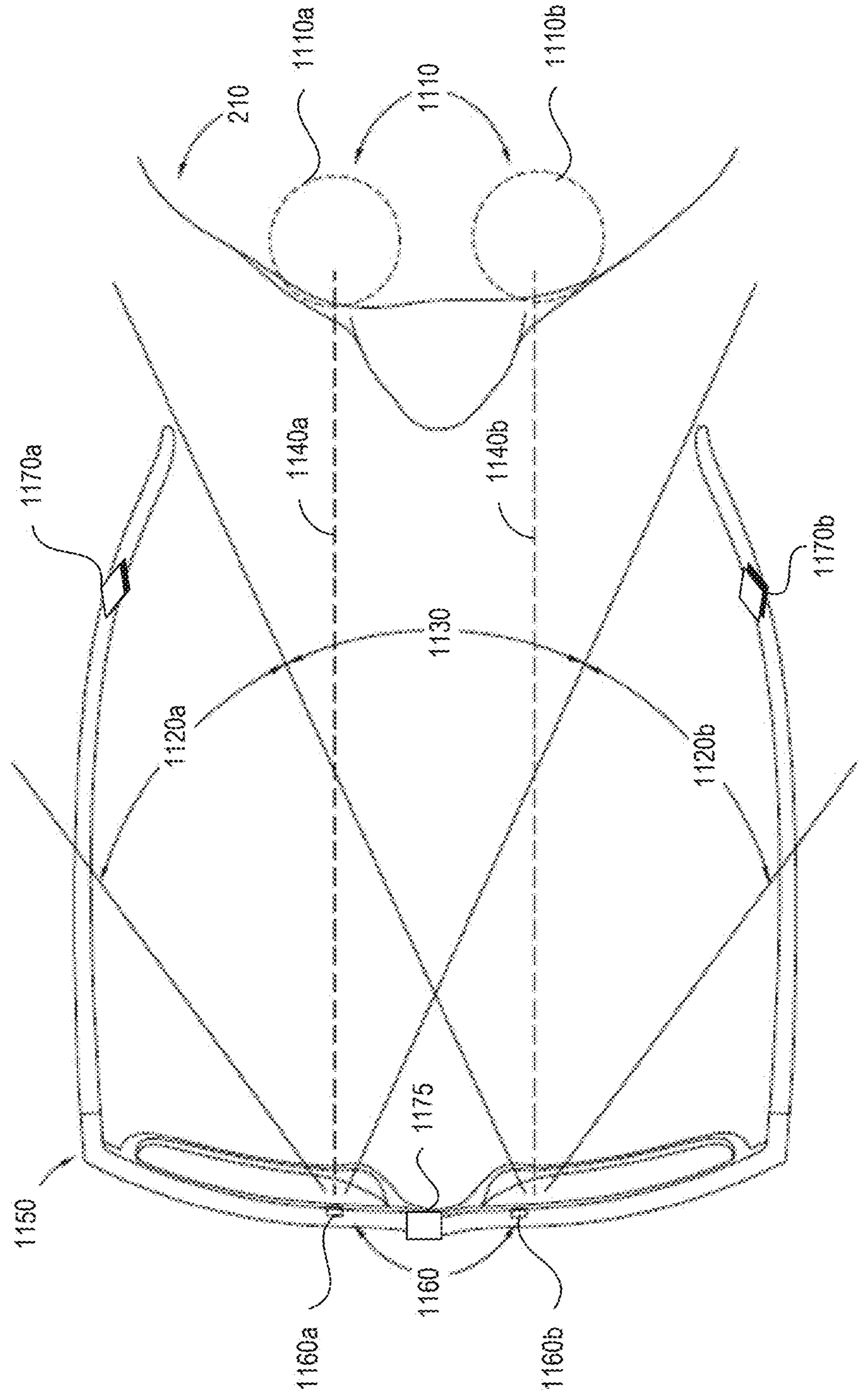
FIG. 11 illustrates an example wearable device which can acquire images of a user's face while the user is putting on (or taking off) the wearable device.

FIG. 11 illustrates an example wearable device which can acquire images of the user's face while the user is putting on the wearable device. The images acquired while the user is putting on (or taking off) the wearable device may be used to generate a face model of the user. The wearable device 1150 can be an example head-mounted device (HMD) described with reference to FIG. 2. The wearable device 1150 can include an imaging system 1160 which is configured to image the user's 210 face. For example, the imaging system 1160 may include sensors such as eye cameras (e.g., eye camera **1160*a* and eye camera 1160*b*) configured to image the periocular region of the user's eyes 1110 while the user 210 is wearing the wearable device. In this example, the eye 1110*b* can correspond to the eye 302 and the eye 1110*a* can correspond to the eye 304 shown in FIG. 3. In some implementations, the imaging system 1160 may be an embodiment of the inward-facing imaging system 462 shown in FIG. 4**.

As shown in FIG. 11, the imaging system 1160 points toward the head of the user 210. The eye camera **1160*a* may be configured to image the eye 1160*a* while the eye camera 1160*b* may be configured to image the eye 1110*b*. In this figure, the optical axis 1140*a* of the eye camera 1160*a* is parallel to the optical axis 1140*b* of the eye camera 1160*b*. In some implementations, one or both of the eye cameras may be rotated such that the optical axes of the two eye cameras are no longer in parallel. For example, the two eye cameras may point slightly towards each other (e.g., particularly if the eye cameras are disposed near outside edges of the frame of the device 1150**). This implementation may be advantageous because it can create a cross eyed configuration which can increase the overlap of the field of view (FOV) between the two cameras as well as to allow the two eye cameras to image the face at a closer distance.

Each eye camera may have a FOV. For example, the FOV for the eye camera 1160*a* can include the region 1120*a* and the region 1130. The FOV for the eye camera 1160*b* can include the region 1120*b* and the region 1130. The FOV of the eye camera 1160*a* and the FOV of the eye camera 1160*b* may overlap at the region 1130. Because of this overlapping FOV 1130, in some embodiments, the two eye cameras may be treated as a single stereoscopic imaging system. The two eye cameras may take images of the face when the face is within the overlapping FOV in order to provide a 3D image of the user's face.

In some situations, when the wearable device 1150 is too close to the user 210, the eye cameras may be out of focus. For example, assuming the periocular separation for the user is 46 mm (typical for an adult male) and each of the two eye cameras has a horizontal FOV of 66 degrees (appropriate for eye-tracking), then the wearable device may take pictures when the distance between the face and the wearable device is at least about 175 mm. The minimum focal distance for the lenses of many eye cameras is approximately 14 mm. If the lenses have fixed focal length, their depth of focus needs to be about 65 diopters.

If the images are obtained when there is insufficient depth of focus, the wearable device 1150 may treat the images as low resolution images. As a result, the face model generated by the wearable device may have a lower fidelity or have sparse representations of gross facial features. Such face model may still be used to deduce an interocular separation for the user, which is useful for determining whether the wearable device fits the user's face.

Example Triggers for Imaging the User's Face

The wearable device 1150 can use a variety of techniques to determine the triggers for starting and stopping imaging the user 210. For example, the wearable device 1150 may be configured to start imaging the user's face when it detects that the user is putting on (or taking off) the wearable device 1150. Advantageously, the triggers for initiating or stopping image acquisition can be based on data related to the movement of the wearable device 1150 (e.g., where such movement may be measured using an IMU in the device) or images acquired by one or more cameras of the wearable device 1150 (e.g., cameras in the inward-facing imaging system 462 or the outward-facing imaging system 464, which detect, for example, regions of the user's face getting larger or smaller as the device gets closer or farther away from the user's face). Thus, the wearable device can automatically initiate or stop the image acquisition free from user interventions.

The wearable device 1150 can use various sensors described with reference to FIGS. 2 and 7 for the detection of movement of the device 1150. The example sensors 1170*a*, 1170*b* (shown in FIG. 11) are disposed on the frame of the device 1150 (e.g., on the ear stems). The sensors 1170*a*, 1170*b* can comprise inertial measurement units, pressure sensors, proximity sensors, etc. In other implementations, sensors are disposed on only one side of the device 1150 (e.g., on one ear stem). The data acquired by the sensors may be analyzed against a corresponding threshold level (e.g., threshold acceleration, threshold pressure, threshold proximity). If the data pass the threshold level, the wearable device 1150 may start or stop the imaging process.

As an example, when a user lifts up the wearable device 1150, the inertial measurement unit of the wearable device 1150 may acquire data on the acceleration of the wearable device 1150. If the wearable device 1150 determines that the acceleration exceeds certain threshold acceleration, the wearable device 1150 may begin to image the user's face. Once the user puts the wearable device, for example, on the head, the acceleration typically will decrease. If the wearable device 1150 determines that the acceleration has reduced to a certain threshold, the wearable device 1150 may stop taking images of the user's face. The device 1150 may also image the user's face when the user takes the device off his or her face. The device may start imaging when the acceleration passes a typical value for device removal and may continue imaging for a time period or until the device 1150 is at or beyond a certain distance away from the user's face.

As another example, the wearable device 1150 may have a pressure sensor. The pressure sensor may be located at the temple (such as the earpieces) of glasses, or the nose pad of a wearable device. When the wearable device 1150 is put onto the user's face, the pressure sensor may send a signal indicating that the wearable device 1150 is on the user. As a result, the wearable device 1150 may stop acquiring images of the user's face.

Triggers can also be based on data acquired by one or more imaging system of the wearable device 1150. For example, the wearable device 1150 can use images obtained by the inward-facing imaging system 462 to determine whether to stop imaging the user's face. For example, as the user is putting on the device, the content in the images acquired by the inward-facing imaging system 462 may change. When the device is sitting on the user's head, however, the content of the images will not change as much compared to when the user is putting on (or taking off) the device. Thus, the wearable device can stop recording when it observes that a certain threshold number (e.g., 3, 5, 10, etc.) of consecutive image frames or images within a certain threshold duration of time have substantially the same content (e.g., the wearable device can stop imaging once the wearable device detects that the user's eyes appear in the acquired images for 5 seconds consecutively). As another example, as the user is taking off the wearable device, the inward-facing imaging system may initially observe an eye, then the periocular region, then the upper face, then the lower face, and then the user's neck. This sequence of images would be reversed if the user were putting on the device. By detecting this sequence of images, the device can infer it is being put on (or taken off) the user's face. In some cases, the image of the user may become smaller than a threshold (e.g., when the device is at arm's length from the user) or may disappear completely (e.g., because the device has been placed on a table and the imaging system no longer points toward the user). Once the wearable device detects that the device is no longer on the user (e.g., by detecting the imaging sequences described above, or because the user's face does not appear in or is smaller than a threshold)), the wearable device can stop acquiring images.

In some situations, the wearable device can continuously acquire images before the detection of the starting trigger or after the detection of the stopping trigger. But the wearable device can be configured to associate the images with the generation of the face model if the images are acquired in-between the starting trigger and the stopping trigger. As one example, the wearable device, can detect a starting trigger based on data acquired from IMU (e.g., where an increase in acceleration is detected). Thus, the images acquired after this starting trigger may be stored or tagged as being associated with generation of the face model. However, when the wearable device detects the stopping trigger (e.g., when, there is no longer acceleration or the images contain mostly periocular region), the wearable device will stop associating the acquired images with the generation of the face model.

The wearable device 1150 can also include sensors for measuring the distance between the wearable device 1150 and the user 210. For example, the sensors may emit and receive signals such as acoustic or optical signals, and use the signals or the feedback of the signal to measure the distance. The wearable device 1150 may also determine the distance by analyzing images acquired by the imaging system 1160. For example, the wearable device 1150 may determine the distance based on the size of the face in the image, where a big size may indicate a small distance while a small size may indicate a large distance. The wearable device 1150 may image the user's face when the distance passes a threshold or is within a certain range. For example, as shown in FIG. 11, the two eye cameras of the wearable device 1130 may stereoscopically image the user's face when the user's face is inside of the region 1130. Once the distance between the user's face and the wearable device 1150 becomes sufficiently small so that the user's face falls outside of the region 1130, the wearable device 1150 may stop imaging the user's face. As another example, the wearable device 1150 may stop imaging the user's face when the distance between the user 210 and the wearable device 1150 is small enough to cause the images to be out of focus.

In some implementations, the device 1150 comprises one or more proximity sensors (e.g., capacitive proximity sensors) that may be disposed along the frames. When the user's head is approaching a proximity sensor (or begins to move between a pair of proximity sensors), face imaging can be started, and when the device 1150 is on the user's face, the imaging can stop.

The device 1150 can include a light emitter 1175 configured to illuminate toward the user's face in the region 1130. When the device 1150 starts imaging, the light can be turned on to provide face illumination, and when the device 1150 stops imaging, the light can be turned off. In some implementations, the light 1175 may be part of the inward-facing imaging system 1160. For example, one or both eye cameras 1160*a* and 1160*b* may be able to illuminate the light.

Additional Examples for Acquiring Images of the Face

In addition to or in alternative to imaging the face using the imaging system 1160, the wearable device 1150 can obtain images of the face using other techniques. For example, the wearable device 1150 may include an outward-facing imaging system (see e.g., outward facing imaging system 464 described in FIG. 4) configured to image the user's environment while the user is wearing the wearable device. The user can point the cameras of the outward-facing imaging system toward the head of the user and obtain images of the face using the outward-facing imaging system.

The outward-facing imaging system can also acquire images of the face when the user is near a mirror. For example, the outward-facing imaging system can acquire the reflected images of the user while the user is standing in front of the mirror. The wearable system can detect the presence of the mirror and the reflected image of the user's head using facial recognition algorithm described with reference to FIG. 12. A facial recognition algorithm may be used alone or in combination with a co-motion test. In a co-motion test, the wearable system analyzes the movement of the user based on data acquired by the IMU or observed via the outward-facing imaging system and compares such movement with the movement of the reflected image as observed by the outward-facing imaging system. If these two measured movements substantially track each other, then the device can assume they are co-moving and the reflected images represent the user. The wearable system can find the reflected images belong to the user if the facial recognition of the reflected images matches the user's face or if the co-motion associated with the reflected image correlates with the user's motion as observed by the wearable device. Additional examples of detecting the presence of a mirror and analyzing the reflected images of the user's face are further described in U.S. Publication No. 2017/0206691, titled "Augmented Reality Systems and Methods Utilizing Reflections", the disclosure of which is hereby incorporated by reference in its entirety.

Furthermore, although the examples described herein are with reference to imaging the user's face while the user is putting on the wearable device, the imaging can also occur when the user is taking off the wearable device. For example, the wearable system may determine the user's identity before the user puts on the wearable device or when the user is interacting with the wearable device. The wearable system can determine the user's identity based on the credentials inputted by the user or by recognizing user's identity based on the user's biometric information, such as, e.g., iris recognition or face recognition. The wearable system can associate the images acquired when the wearable device is taken off with the identity of a user before the wearable device is removed. The wearable system can also combine the images acquired while the user is putting on the wearable device with the images acquired while the user is taking off the wearable device to generate the face model for the user.

Examples of Generating a Face Model Using Stereo Vision Techniques

As shown in FIG. 11, the eye camera 1160*a* and the eye camera 1160*b* can have an overlapping FOV 1130. Because of this overlapping FOV, the two eye cameras may be treated as a single stereoscopic system for imaging the user's face when the user's face is within the region 1130.

While the user's face is within the region 1130, the eye camera 1160*a* and 1160*b* can capture pairs of images of the user as the wearable device 1150 approaches the user 210. For example, a pair of images may include an image taken by the eye camera 1160*a* and an image taken by the camera 1160*b* at the same time. For a pair of images, the wearable device 1150 can analyze information of the face using a stereo vision algorithm such as a block-matching algorithm, a semi-global matching algorithm, a semi-global block-matching algorithm, disparity maps, triangulation, depth maps, a neural network algorithm, a simultaneous location and mapping algorithm (e.g., SLAM or vSLAM), and so on. For example, the wearable device may associate depths to many or all of the pixels in the images based on a comparison between the image acquired by the camera 1160*a* and the image acquired by the camera 1160*b*.

The wearable device 1150 can apply the same technique to multiple pairs of images to extract information of the face. The wearable device 1150 can fuse the information from the multiple pairs of images to generate a face model. The wearable device 1150 can use a variety of techniques to consolidate the information. As an example, the wearable device 1150 may use a point cloud to represent the face. Clouds associated with multiple pairs of the images may be fit together using various algorithms such as an Iterative Closest Point (ICP) algorithm. The wearable device 1150 can reject outliers in the cloud data and smooth the surface of the face model using techniques such as clustering, averaging, or other similar techniques.

As another example, The wearable device can use keypoints to represent the face. The keypoints may be abstract keypoints such as values generated by a keypoints detector and descriptor algorithm such as scale-invariant feature transform (SIFT), speeded up robust features (SURF), oriented FAST and rotated BRIEF (ORB), and so on. The keypoints may also be features unique to the face such as eye corners, mouth corners, eyebrows, and so on. For each pair of images, the wearable device 1150 can match the keypoints in the image taken by the eye camera 1160*a* and the keypoints in the image taken by the eye camera 1160*b*.

The wearable device 1150 can further deduce the changes of the pose (such as the position and orientation of the face) across multiple pairs of images, for example, by analyzing the position changes of the keypoints.

The wearable device 1150 can convert the keypoints to a coordinate frame associated with the face. Data from pairs of the images may be fused together using the coordinate frame. The coordinate frame may be used to average, aggregate, and reject outlier data. Additionally or alternatively, the wearable device 1150 may use bundle adjustment technique to generate the face model. For example, the wearable device 1150 can reconstruct the face model using a single minimization framework which accommodates all data from pairs of images as well as the changes in the pose across pairs of images.

Examples of Generating a Face Model Using Monocular Vision Techniques

In addition to or in alternative to building a face model using stereo vision techniques, the wearable device 1150 can also build the face model by fusing images of the face on a monocular basis. The monocular vision techniques can be advantageous when the two cameras do not have an overlapping FOV region 1130 or when the overlap is small.

For example, the camera 1160*a* can take multiple monocular images as the user is putting on the wearable device 1150. The wearable device 1150 can generate a portion of the face model based on these images using vSLAM or similar algorithms. The wearable device 1150 can calculate a trajectory associated with the movement of the camera 1160*a* based on the keypoints in these images. Similarly, wearable device 1150 can use the same techniques to generate another portion of the face model based on the images taken by the eye camera 1160 and calculate the trajectory associated with the movement of the camera 1160*b*.

Because the two cameras can be rigidly coupled to the wearable device 1150, the relative position of the two cameras does not change during the imaging process. The wearable device can use the relative position and angles of the two cameras and/or the trajectories to combine the two portions of the face models into a single model. In some implementations, the trajectories may also be used to calculate interocular distance.

In some embodiments, the wearable device 1150 can use the images of one camera to generate the face model even though that camera may have a limited field of view. For example, the wearable device can use images acquired by the eye camera 1160*a* to generate a face model on a portion of the face. Because the face of the user 210 is symmetric, the wearable device can axially transform the portion of the face to obtain the other portion of the face. These two portions of the face may be combined together to generate the face model.

Other Example Embodiments

The images taken by the wearable device and other computing systems may be used to generate a texture map for the face. The texture map of the face may include skin colors, eye colors, facial features such as freckles or wrinkles, and so on. The wearable device can fuse images taken by the two eye cameras to generate an image of the whole face. The fused image may be processed to enhance the quality. The wearable device can use techniques such as super resolution, lucky imaging, or other image processing techniques for increasing the quality. Additionally or alternatively, the wearable device may identify an image taken by one of the two eye cameras and process that image to create the texture map. For example, the wearable device may identify that an image taken by the eye camera 1160*a* (shown in FIG. 11) includes the whole face of the user. The wearable device may process that image and use that image to extract the texture map.

The face model and the texture map may be stored in the wearable device or in a remote storage location. They may be shared with other wearable devices or computing systems. For example, during a telepresence session, the face model and the texture map of a first user may be shared with the second user to create a tangible sense of the first user's presence in the second user's environment.

In some implementations, the face model may be generated based on images taken by the wearable device during multiple imaging sessions and/or based on images acquired by other computing systems. For example, the wearable device may acquire images of the user's face while the user is putting on the wearable device and taking off the wearable device. The wearable device may generate the face model based on images acquired while the user is putting on the wearable device and images acquired while the user is taking off the wearable device.

The wearable device can also update an existing face model using the acquired images. For example, the wearable device can collect new images of the user's face while the user is putting on the wearable device and update the face model previously generated for the same user based on the new images.

The wearable device can also update a face model generic to a group of users using the new images. In some embodiments, people with different demographical information (such as age, gender, race, etc.) may have different generic face models. For example, female teenagers may be associated with a generic face model while male adults may be associated with another generic face model. The wearable device can select a generic face model for the user based on the user's demographic information and update the generic face model with user specific information acquired while the user is putting on the wearable device.

The user can also customize the face model, for example, by selecting different facial features and texture maps. As an example, the user can select the appearance of a fantasy creature such as a science fiction alien during a telepresence session.

Although these examples refer to building a face model using a wearable device, not all processes of face model generation or updates are required to be performed on the wearable device. The wearable device can communicate with a remote computing device to generate a face model. For example, the wearable device can acquire images of the user's face and pass the images (alone or in combination with other information of the user, such as, e.g., the user's demographic information) to a remote computing device (e.g., such as a server). The remote computing device can analyze the images and create the face model. The remote computing device can also pass the face model back to the wearable device of the user or pass the face model to another user's wearable device (e.g., during a telepresence session).

Example Processes for Generating a Face Model

Figure 12:
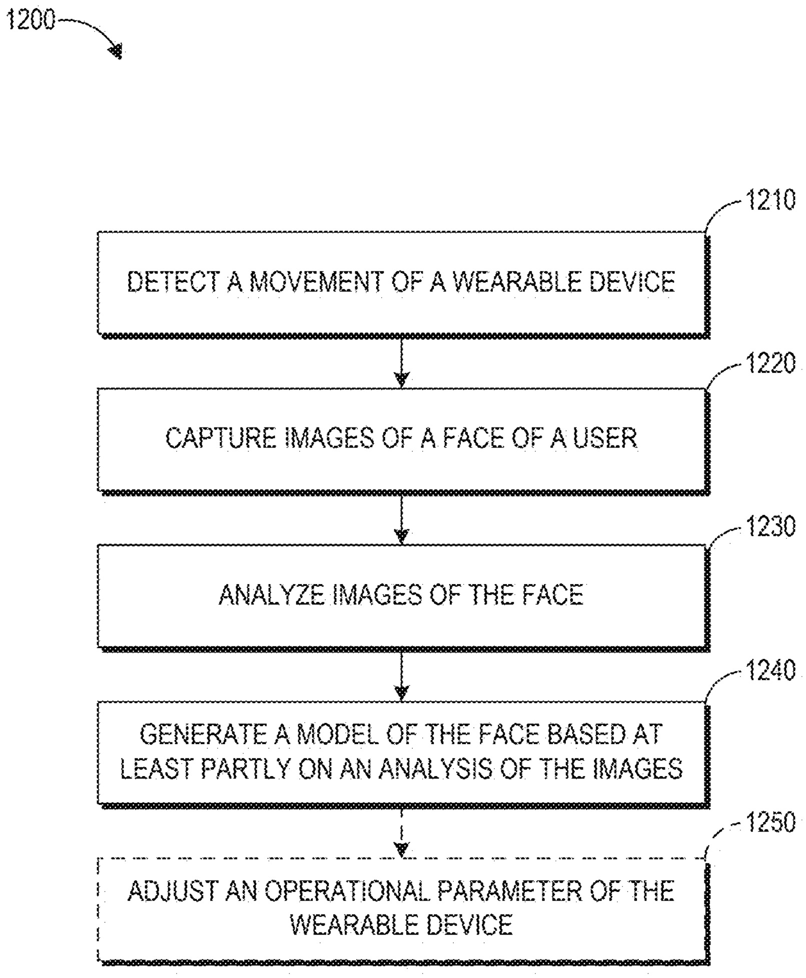
FIG. 12 illustrates an example process for generating a face model.

FIG. 12 illustrates an example process for generating a face model. The process 1200 may be performed by the wearable device 1150 described in FIG. 11. The wearable device 1150 can include a variety of sensors such as one or more eye cameras and IMUs (described in FIGS. 2 and 7).

At block 1210, the wearable device can detect a movement of the wearable device. The movement may involve disposing the display device adjacent to a head of the user (either toward the user, for putting on the device, or away from the user, for taking off the device). For example, the wearable device can use acceleration data acquired by the IMUs and determine whether the acceleration exceeds a threshold acceleration. If the acceleration exceeds the threshold acceleration, the wearable device may determine that the user is putting on (or taking off) the device.

At block 1220, the wearable device can capture the images of the user's face. For example, one or more eye cameras may each image the user's face while the user is putting on or taking off the wearable device. The eye camera(s) may image the user's face through a video or multiple photographs.

At block 1230, the wearable device can analyze the images taken by the one or more eye cameras. In some implementations using two eye cameras, when the two eye cameras are sufficiently far away from the user, the two eye cameras may have an overlapping FOV. Accordingly, the two eye cameras may be treated as a stereoscopic imaging system. The wearable device can analyze the images at different depths using a stereoscopic vision algorithm described with reference to FIG. 11. The result of the analysis may be represented by a point cloud. The wearable device can also analyze the images by extracting identifiable features of the face using a keypoints detector and descriptor algorithm. Accordingly, the face may be represented by keypoints of identifiable features.

At block 1240, the wearable device can combine the images taken at different depths to generate a face model. The wearable device can also generate the face model by aligning the identifiable features using a coordinate frame as described with reference to FIG. 11.

The one or more eye cameras, however, are not required to have an overlapping FOV. Accordingly, at blocks 1230 and 1240, the wearable device may use a single eye camera and use monocular vision techniques described with reference to FIG. 11 to generate the face model. For example, the wearable device may analyze the images acquired by each eye camera separately and combine the results of the analysis for each eye camera to generate the face model or the device may have a single eye camera (e.g., to track one of the user's eyes, with movement of the other eye inferred from movement of the measured eye) and use monocular vision techniques to generate the face model.

At optional block 1250, an operational parameter of the wearable device may be adjusted. The operational parameter may include a location of a virtual image rendered by the device, a relative position or an orientation of a light projector used to generate a virtual image (e.g., one or more of the image injection devices 420, 422, 424, 426, 428), etc. The operational parameter may be adjusted based on an analysis of the images or the face model. For example, the wearable device can measure interocular separation based on the user's face model. The wearable device can accordingly adjust the orientation of the light projectors corresponding to each eye to cause the virtual images to be rendered in a suitable location for the user's eyes.

In addition to or as an alternative to adjusting operational parameters, the wearable device can also analyze the images for other purposes, such as, e.g., to determine a fit of the wearable device on the user's head, perform user identification or authentication, or perform image registration or calibration. As an example of determining fit of the wearable device, the wearable device can analyze the appearance of the user's periocular region to determine whether the wearable device is titled. Further descriptions of determining a fit of the wearable device are provided in U.S. Application No. 62/404,493, titled "Periocular Test for Glasses Fit", the disclosure of which is hereby incorporated by reference herein in its entirety.

As an example of determining a user's identity based on the images, the wearable device can analyze facial features of the user by applying various facial recognition algorithms to the acquired images (e.g., face shape, skin tone, characteristics of nose, eyes, cheeks, etc.). Some example facial recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching, or a 3D face recognition algorithm. The device may also analyze the images to identify the iris and determine a biometric signature (e.g., an iris code), which is unique to each individual.

The wearable device can also perform image registration based on the images acquired by the wearable device while the device is being put on or taken off the user's face. The resulting image obtained from the image registration can include a portion of the user's environment (e.g., the user's room or another person near the user) in addition to or in alternative to the user's face.

Figure 13A:
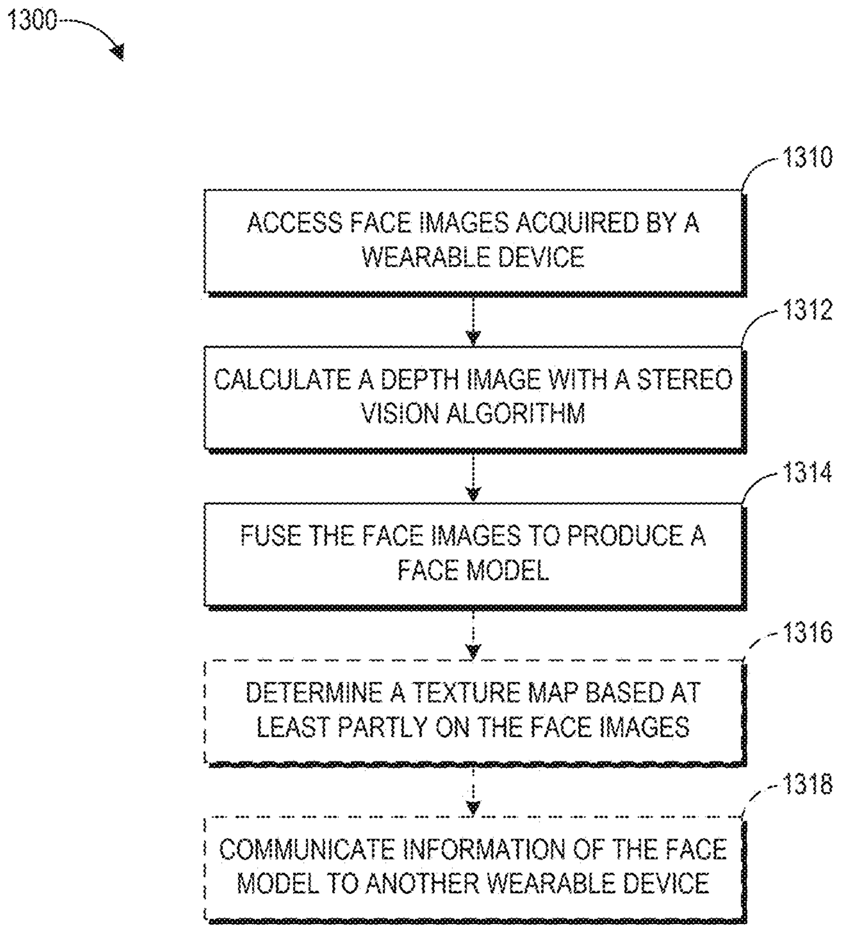
FIG. 13A describes an example process of generating a face model using stereo vision techniques.

FIG. 13A describes an example process of generating a face model using stereo vision techniques. The example process 1300 can be performed by the wearable device or a remote computing device (such as, e.g., a computer or a server) alone or in combination.

At block 1310, the face images acquired by a wearable device may be accessed. The face images may have been acquired concurrent with putting on or taking off the device (see, e.g., blocks 1210 and 1220 of the process 1200). The face images include pairs of images taken at different depths by the inward-facing imaging system 462. With reference to FIG. 11, a pair of images can include a first image taken by the eye camera 1160*a* and a second image taken by the eye camera 1160*b*. The first image and the second image may be taken by their respective cameras when the wearable device 1150 is at substantially the same depth. The first image and the second image may also be taken by their respective cameras at substantially the same time. The accessed face images can also include images taken during multiple sessions. For example, some face images may have been taken a week prior to the present time while a user was putting on the wearable device, while other face images may have been taken a day before the present time when the user was putting on the wearable device. The face images may be stored on the wearable device 1150 or in the remote data repository 280. The wearable device 1150 can communicate the face images to the remote data repository 280 as the face images are being acquired or can upload the face images to the remote data repository 280 after the face images have been acquired.

At block 1312, a stereo vision algorithm may be applied to the accessed face images to calculate a depth image. Examples of stereo vision algorithms include a block-matching algorithm, a semi-global matching algorithm, a semi-global block-matching algorithm, disparity maps, triangulation, depth maps, a neural network algorithm, a simultaneous location and mapping algorithm (e.g., SLAM or vSLAM), and so on. The depth image may be a 3D model which contains information relating to the distance between the face and the wearable device. For example, the stereo vision algorithm may be applied to one or more pairs of images and the resulting output can include depth assignments to many or all pixels in the original one or more pairs of images.

At block 1314, the face images can be fused together to produce a face model. Many techniques may be used for such fusion. As one example, the face may be treated as a point cloud (which would naturally result from the stereo computation at block 1312). Multiples of such clouds (resulting from multiple applications of the stereo vision algorithms) may be fit to one another using algorithms such as ICP. Subsequently, outliers may be rejected and the surface may be smoothed by clustering, averaging, or using another similar technique. The face model arising from the point clouds calculation may be a dense model.

Faces may also be modeled as collections of keypoints (such as, e.g., a set of sparse, distinct, and visually salient features), or may be modeled by the identification and localization of particular features unique to the face (e.g., eye corners, mouth corners, eyebrows, etc.). In either case, these features may be "fused" together with mathematical combinations to minimize uncertainty in the features' locations. As one example, the keypoints may be matched from one image frame to another image frame, which can also deduce pose change (e.g., changes in the position and orientation of the user's head). In this case, the features or keypoints may be converted to a common coordinate frame fixed to the face. Thereafter, like keypoints can be averaged, or similarly aggregated, possibly including some degree of outlier rejection. The face model may be a sparse model if keypoints techniques are used.

At the optional block 1316, the texture map may be applied to the face model. The texture map may be determined based on the user's face images. For example, the texture map may include skin tones as appeared in the face images.

At the optional block 1318, the face model may be communicated to another wearable device. For example, while the user is in a telepresence session with another user, the face model may be used to create an avatar of the user and the face model may be passed to the other user's wearable device. The face model may also be communicated to the user in some situations. The user can further manipulate the face model such as, e.g., by applying a hair style or changing skin color or appearance.

Figure 13B:
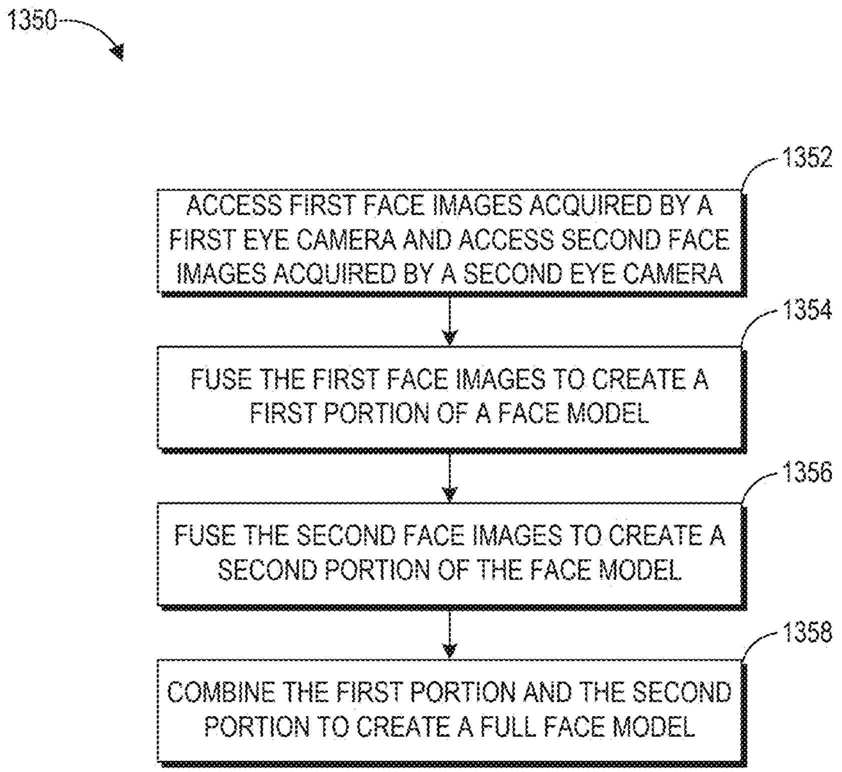
FIG. 13B describes an example process of generating a face model using monocular vision techniques.

FIG. 13B describes an example process of generating a face model using monocular vision techniques. The example process 1350 can be performed by the wearable device or a remote computing device (such as, e.g., a computer or a server) alone or in combination.

At block 1352, first face images and second face images can be accessed. The face images may have been acquired concurrent with putting on or taking off the device (see, e.g., blocks 1210 and 1220 of the process 1200). The first face images may be acquired by a first eye camera and the second face images may be acquired by a second eye camera. The first eye camera and the second eye camera may each be configured to image a portion of the user's face. As the user is putting on the wearable device, the first eye camera and the second eye camera may each be configured to take a series of images.

At block 1354, the first face images can be analyzed and fused together to create a first portion of a face model, while at block 1356, the second face images can be analyzed and fused together to create a second portion of the face model. The first portion and the second portion of the face model can be created based on the first face images and the second face images, respectively, using various mapping techniques, such as SLAM, vSLAM, or other mapping techniques described with reference to the object recognizers 708.

At block 1358, the first portion and the second portion of the face model can be combined to create a full face model. The wearable device can use the relative position and angles of the first and second cameras alone or in combination with the movement trajectories of the wearable device (as deduced from the first images and the second images) to combine the two portions of the face model into a single model.

Although the examples are described with reference to a face model, similar techniques can also be applied to generate virtual images of other parts of the body (alone or in combination with the face). For example, while the user is putting on the wearable device, some of the images acquired by the inward-facing imaging system can include a portion of the user's torso, e.g., the user's neck or upper body (e.g., shoulders). The wearable system can generate a face model in combination with a model of the user's neck or the upper body using similar algorithms as described in FIGS. 11-13B. As another example, the user can turn the outward-facing imaging system to face the user and scan the user's body. The images acquired from such scan can also be used to generate a model of the user's body. The model of the user's body can also be used in a virtual avatar (e.g., during a telepresence session).

Additional Aspects of Face Model Capture with a Wearable Device

In a 1st aspect, an augmented reality (AR) system for generating a three-dimensional (3D) model of a face of a user, the system comprising: an augmented reality device (ARD) configured to display a 3D environment to the user; an inward-facing imaging system comprising a first eye camera and a second eye camera, wherein the inward-facing imaging system is configured to image a portion of the face of the user; an inertial measurement unit (IMU) associated with the ARD and configured to detect movements of the user; a computer processor associated with the ARD and programmed to: receive an indication of a movement from the IMU, wherein the movement involves putting the ARD onto a head of the user; while the ARD is being put onto the head of the user: receive first images of the face from the first eye camera; and receive second images of the face from the second eye camera; analyze the first images and the second images; and generate a face model of the face based at least partly on analysis of the first images and the second images.

In a 2nd aspect, the system of aspect 1, wherein the IMU comprises one or more of: an accelerometer, a compass, or a gyroscope.

In a 3rd aspect, the system of any one of aspects 1-2, wherein the indication of the movement comprises an increase in an acceleration of the ARD or a measurement of the acceleration of the ARD that passes a threshold acceleration.

In a 4th aspect, the system of any one of aspects 1-3, wherein to analyze the first images and the second images, the computer processor is programmed to convert the first images and the second images to point clouds in a 3D space using a stereo vision algorithm.

In a 5th aspect, the system of aspect 4, wherein the stereo vision algorithm comprises at least one of a block-matching algorithm, a semi-global matching algorithm, a semi-global block-matching algorithm, or a neural network algorithm.

In a 6th aspect, the system of aspect 5, wherein to generate the face model, the computer processor is further programmed to combine the point clouds using an iterative closest point algorithm.

In a 7th aspect, the system of any one of the aspects 1-6, wherein to analyze the first images and the second images, the computer processor is further programmed to identify keypoints in the first image and the second image using a keypoints detector and descriptor algorithm.

In an 8th aspect, the system of any one of the aspects 1-7, to analyze the first images and the second images, the computer processor is further programmed to: identify facial features of the face based at least partly on the first images and the second images; and describe the identified facial features with the points in the 3D space.

In a 9th aspect, the system of any one of aspects 7-8, wherein to generate the face model, the computer processor is configured to combine facial features or keypoints using a bundle adjustment algorithm.

In a 10th aspect, the system of any one of aspects 1-9, wherein to analyze the first images and the second images and to generate the face model, the computer processor is programmed to: generate a first portion of the face model based at least partly on the first images; generate a second portion of the face model based at least partly on the second images; and combine the first portion of the face model and the second portion of the face model to obtain the face model.

In an 11th aspect, the system of aspect 10, wherein to analyze the first images and the second images is performed by a visual simultaneous location and mapping algorithm.

In a 12th aspect, the system of any one of the aspects 1-11, wherein the first images comprise first frames of a first video taken by the first eye camera and the second images comprise second frames of the video taken by the second eye camera.

In a 13th aspect, the system of aspect 12, wherein to generate the face model, the computer processor is programmed to combine the first frames of the video with the second frames of the video.

In a 14th aspect, the system of any one of aspects 1-13, the computer processor is further configured to generate a texture map associated with the face model of the face based at least partly on one or more images in the first images or the second images.

In a 15th aspect, the system of any one of aspects 1-14, wherein the computer processor is further configured to share the face model of the face with another user.

In a 16th aspect, the system of any one of aspects 1-15, wherein the first eye camera is configured to image a left eye of the user and the second eye camera is configured to image a right eye of the user.

In a 17th aspect, the system of any one of aspects 1-16, wherein the first eye camera and the second eye camera have an overlapping field of view.

In an 18th aspect, a method of generating a three-dimensional (3D) model of a face of a user, the method comprising: under control of a wearable device comprising computer hardware, a display device configured to display a 3D environment to the user, an imaging system configured to image a portion of the face of the user, and an inertial measurement unit (IMU) configured to detect movements of the display device: detecting, by the IMU, a trigger for imaging a face of the user, wherein the trigger comprises a movement involving disposing the display device adjacent to a head of the user; capturing, by the imaging system, images of at least a portion of a face of the user; analyzing the images captured by the imaging system; and generating the face model based at least partly on the analysis of the images.

In a 19th aspect, the method of claim 18, wherein detecting the trigger comprises: determining, by the IMU, an acceleration of the display device; comparing the acceleration of the display device with a threshold acceleration; and detecting the trigger in response to a comparison that the acceleration exceeds the threshold acceleration.

In a 20th aspect, the method of any one of aspects 18-19, wherein one or more of the images comprises a portion of a body of the user other than the face.

In a 21st aspect, the method of any one of aspects 18-20, wherein the images comprises first images captured by a first eye camera of the imaging system and second images captured by a second eye camera of the imaging system.

In a 22nd aspect, the method of aspect 21, wherein analyzing the images comprises: converting the first images and the second images to point clouds using a stereo vision algorithm.

In a 23rd aspect, the method of aspect 22, wherein the stereo vision algorithm comprises at least one of a block-matching algorithm, a semi-global matching algorithm, a semi-global block-matching algorithm, or a neural network algorithm.

In a 24th aspect, the method of aspect 23, wherein generating the face model of the face comprises combining the point clouds using an iterative closest point algorithm.

In a 25th aspect, the method of any one of aspects 22-24, wherein analyzing the images comprises identifying keypoints associated with the face of the user in the images, and wherein generating the face model of the face comprises generating the face model with the keypoints using a bundle adjustment algorithm.

In a 26th aspect, the method of any one of aspects 22-25, wherein analyzing the images comprise: analyzing the first images to generate a first portion of the face model using a visual simultaneous location and mapping algorithm; and analyzing the second images to generate a second portion of the face model using the visual simultaneous location and mapping algorithm.

In a 27th aspect, the method of aspect 26, wherein generating the ace model of the face comprises: combining the first portion of the face model and the second portion of the face model to generate the face model.

In a 28th aspect, the method of any one of aspects 18-27, wherein the images comprises frames of a video taken by the imaging system.

In a 29th aspect, the method of any one of aspects 18-28, further comprising: generating a texture map associated with the face model based at least partly on the images.

In a 30th aspect, the method of any one of aspects 18-29, wherein generating the face model comprises: accessing a pre-existing face model; and updating the pre-existing face model based at least partly on the analysis of the images.

In a 31st aspect, the method of aspect 30, wherein the pre-existing face model comprises at least one of the following: a generic face model or a previously generated face model of the face of the user.

In a 32nd aspect, the method of any one of aspects 18-31, wherein generating the face model comprising: accessing images of the face previously acquired by the wearable device or by another computing device; and generating the face model based at least partly on the analysis of images captured by the imaging system and the accessed images.

In a 33rd aspect, the method of any one of aspects 18-32, further comprising: communicating the face model to another display device; and displaying, by the other display device, an image associated with the face of the user based at least partly on the face model.

In a 34th aspect, a system for generating a three-dimensional (3D) model of a face of a user, the system comprising: a head-mounted display (HMD) configured to present virtual content to a user; an inward-facing imaging system comprising at least one eye camera, wherein the inward-facing imaging system is configured to image at least a portion of the face of the user while the user is wearing the HMD; an inertial measurement unit (IMU) associated with the HMD and configured to detect movements of the HMD; and a hardware processor programmed to: detect a trigger to initiate imaging of a face of the user, wherein the trigger comprises a movement detected by the IMU involving putting the HMD onto a head of the user or taking the HMD off of the head of the user; activate, in response to detecting the trigger, the at least one eye camera to acquire images; detect a stopping condition for stopping the imaging based on data acquired from at least one of the IMU or the inward-facing imaging system; analyze the images acquired by the at least one eye camera with a stereo vision algorithm; and fuse the images to generate a face model of the user's face based at least partly on an output of the stereo vision algorithm.

In a 35th aspect, the system of aspect 34, wherein to detect the trigger, the hardware processor is programmed to: determine an acceleration of the HMD; compare the acceleration of the HMD with a threshold acceleration; and detect the trigger in response to a comparison that the acceleration exceeds the threshold acceleration.

In a 36th aspect, the system of any one of aspects 34-35, wherein the stopping condition is detected when a distance between the HMD and the head of the user passes a threshold distance.

In a 37th aspect, the system of any one of aspects 34-36, wherein the stereo vision algorithm comprises at least one of: a block-matching algorithm, a semi-global matching algorithm, a semi-global block-matching algorithm, a disparity map, a depth map, or a neural network algorithm.

In a 38th aspect, the system of any one of aspects 34-37, wherein the at least one eye camera comprises a first eye camera and a second eye camera, and wherein the first eye camera and the second eye camera have an overlapping field of view.

In a 39th aspect, the system of aspect 38, wherein the images comprises a plurality of pairs of images, wherein each pair of images comprises a first image acquired by the first eye camera and a second image acquired by the second eye camera.

In a 40th aspect, the system of aspect 39, wherein a pair of images is analyzed together with the stereo vision algorithm.

In a 41 st aspect, the system of any one of aspects 39-40, wherein the output of the stereo vision algorithm comprises depth assignments to pixels in the plurality of pairs of images.

In a 42nd aspect, the system of any one of aspects 39-41, wherein the user's face is represented by a plurality of point clouds based on the analysis of the images acquired by the first eye camera and the second eye camera, and wherein to fuse the images to generate a face model, the hardware processor is programmed to: fit the plurality of clouds to one another; reject outliners in the plurality of clouds; and smooth a surface of the face model by at least one of clustering or averaging.

In a 43rd aspect, the system of aspect 42, wherein the fit the plurality of clouds, the hardware processor is programmed to apply Iterative Closest Point algorithm to the plurality of clouds.

In a 44th aspect, the system of any one of aspects 34-43, wherein the hardware processor is further programmed to: determine a texture map based on the images; and apply the texture map to the face model.

In a 45th aspect, the system of any one of aspects 34-44, wherein the hardware processor is further programmed to pass the face model to a wearable device.

In a 46th aspect, the system of any one of aspects 34-45, wherein to analyze the images, the hardware processor is programmed to at least: identify keypoints in the images using a keypoints detector and descriptor algorithm; or identify facial features from the images and describe the identified facial features with points in a 3D space.

In a 47th aspect, the system of aspect 46, wherein to fuse the images, the hardware processor is programmed to combine the keypoints or facial features using a bundle adjustment algorithm.

In a 48th aspect, a method for generating a three-dimensional (3D) model of a face of a user, the method comprising: receiving a request for generating a face model of a user; accessing images of the user's head acquired by an inward-facing imaging system of a wearable device, wherein the inward-facing imaging system comprises at least one eye camera; identifying a plurality of pairs of images from the accessed images; analyze the images by applying a stereo vision algorithm to the plurality of pairs of images; and fusing outputs obtained from said analyzing step to create a face model.

In a 49th aspect, the method of aspect 48, wherein the outputs comprise a depth map associated with the user's face, which contains information relating to distances between the face and the wearable device.

In a 50th aspect, the method of any one of aspects 48-49, wherein the images are acquired as the wearable is being put on or taken off from the user.

In a 51st aspect, the method of any one of aspects 48-50, wherein the at least one eye camera comprises a first eye camera and a second eye camera, and a pair of images comprises a first image and a second image that are acquired at substantially the same time by the first eye camera and the second eye camera respectively.

In a 52nd aspect, the method of any one of aspects 48-51, wherein analyzing the images comprise converting the plurality of pairs of images into point clouds.

In a 53rd aspect, the method of aspect 52, wherein fusing the outputs comprises combining the point clouds using an iterative closest point algorithm.

OTHER CONSIDERATIONS

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system for generating a three-dimensional (3D) model of a face of a user, the system comprising:
- a head-mounted device (HMD) associated with an inward-facing camera, wherein the inward-facing camera is configured to image at least a portion of the face of the user while the user is wearing the HMD;
- an inertial measurement unit (IMU) associated with the HMD and configured to detect movements of the HMD; and
- a hardware processor programmed to:
  - detect a trigger to initiate imaging of a face of the user, wherein the trigger comprises a movement detected by the IMU involving putting the HMD onto a head of the user or taking the HMD off of the head of the user;
  - activate, in response to detecting the trigger, the inward-facing camera to acquire images; and
  - detect a stopping condition for stopping the imaging based on data acquired from at least one of the IMU and the inward-facing camera, wherein detecting the stopping condition includes determining that an acceleration of the HMD has reduced to a stopping threshold acceleration.

2. The system of claim 1, wherein the hardware processor is also programmed to:
- analyze the images acquired by the inward-facing camera with a stereo vision algorithm; and
- fuse the images to generate a face model of the user's face based at least partly on an output of the stereo vision algorithm.

3. The system of claim 2, wherein the stereo vision algorithm comprises at least one of: a block-matching algorithm, a semi-global matching algorithm, a semi-global block-matching algorithm, a disparity map, a depth map, or a neural network algorithm.

4. The system of claim 2, further comprising a second camera, and wherein the inward-facing camera and the second camera have an overlapping field of view.

5. The system of claim 4, wherein the images comprise a plurality of pairs of images, wherein each pair of images comprises a first image acquired by the inward-facing camera and a second image acquired by the second camera.

6. The system of claim 5, wherein a pair of images is analyzed together with the stereo vision algorithm.

7. The system of claim 5, wherein the output of the stereo vision algorithm comprises depth assignments to pixels in the plurality of pairs of images.

8. The system of claim 5, wherein the user's face is represented by a plurality of point clouds based on the analysis of the images acquired by the inward-facing camera and the second camera, and wherein to fuse the images to generate a face model, the hardware processor is programmed to:
- fit the plurality of clouds to one another;
- reject outliers in the plurality of clouds; and
- smooth a surface of the face model by at least one of clustering or averaging.

9. The system of claim 8, wherein to fit the plurality of clouds, the hardware processor is programmed to apply Iterative Closest Point algorithm to the plurality of clouds.

10. The system of claim 2, wherein to analyze the images, the hardware processor is programmed to at least:
- identify keypoints in the images using a keypoints detector and descriptor algorithm; or
- identify facial features from the images and describe the identified facial features with points in a 3D space.

11. The system of claim 10, wherein to fuse the images, the hardware processor is programmed to combine the keypoints or facial features using a bundle adjustment algorithm.

12. The system of claim 1, wherein to detect the trigger, the hardware processor is programmed to:
- determine the acceleration of the HMD;
- compare the acceleration of the HMD with a starting threshold acceleration; and
- detect the trigger in response to a comparison that the acceleration exceeds the starting threshold acceleration.

13. The system of claim 1, wherein detecting the stopping condition further comprises determining that a distance between the HMD and the head of the user passes a threshold distance.

14. The system of claim 1, wherein the hardware processor is further programmed to:
- determine a texture map based on the images; and
- apply the texture map to the face model.

15. The system of claim 1, wherein the hardware processor is further programmed to pass the face model to a wearable device.

16. A method for generating a three-dimensional (3D) model of a face of a user of a wearable device, the method comprising:

receiving a request for generating a face model of the user;

generating images of the head of the user, the images acquired by an inward-facing camera of the wearable device, wherein generating the images includes:

detecting a trigger to initiate imaging of a face of the user, wherein the trigger comprises a movement detected by an inertial measurement unit (IMU) associated with the wearable device, the movement involving putting the wearable onto a head of the user or taking the wearable off of the head of the user;

activating, in response to detecting the trigger, the inward-facing camera to acquire the images; and detecting a stopping condition for stopping the imaging based on data acquired from at least one of the IMU and the inward-facing camera, wherein detecting the stopping condition includes determining that an acceleration of the wearable device has reduced to a stopping threshold acceleration;

identifying a plurality of pairs of images from the accessed images;

analyzing the images by applying a stereo vision algorithm to the plurality of pairs of images; and fusing outputs obtained from said analyzing step to create a face model.

17. The method of claim 16, wherein the outputs comprise a depth map associated with the user's face, which contains information relating to distances between the face and the wearable device.

18. The method of claim 16, wherein the wearable device comprises the inward-facing camera and a second camera, and a pair of images comprises a first image and a second image that are acquired at substantially the same time by the inward-facing camera and the second camera respectively.

19. The method of claim 16, wherein analyzing the images comprises converting the plurality of pairs of images into point clouds.

20. The method of claim 19, wherein fusing the outputs comprises combining the point clouds using an iterative closest point algorithm.

* * * * *